(12) United States Patent  
Anderson et al.

(10) Patent No.: US 12,183,024 B2  
(45) Date of Patent: *Dec. 31, 2024

(54) METHOD AND SYSTEM FOR OPTICAL YIELD MEASUREMENT OF A STANDING CROP IN A FIELD

(71) Applicant: Deere & Company, Moline, IL (US)

(72) Inventors: Noel W. Anderson, Fargo, ND (US); Gurmukh H. Advani, West Fargo, ND (US); Benjamin M. Smith, Yorktown, VA (US)

(73) Assignee: Deere & Company, Moline, IL (US)

( * ) Notice: Subject to any disclaimer, the term of this patent is extended or adjusted under 35 U.S.C. 154(b) by 912 days.

This patent is subject to a terminal disclaimer.

(21) Appl. No.: 17/301,315

(22) Filed: Mar. 31, 2021

(65) Prior Publication Data

US 2022/0132737 A1  May 5, 2022

Related U.S. Application Data

(60) Provisional application No. 63/198,592, filed on Oct. 29, 2020.

(51) Int. Cl.  
*G06T 7/62* (2017.01)  
*G06T 7/12* (2017.01)  
(Continued)

(52) U.S. Cl.  
CPC .................. *G06T 7/62* (2017.01); *G06T 7/12* (2017.01); *G06V 10/48* (2022.01); *G06V 10/56* (2022.01);  
(Continued)

(58) Field of Classification Search  
CPC ...... G06V 10/255; G06V 10/44; G06V 10/48; G06V 10/56; G06V 10/75; G06V 20/188;  
(Continued)

(56) References Cited

U.S. PATENT DOCUMENTS 4,918,441 A * 4/1990 Bohman ............. G05D 1/0242  
340/901  
7,401,528 B2 * 7/2008 Deppermann ........... G01N 3/20  
56/12.9  
(Continued)

FOREIGN PATENT DOCUMENTS

CN 115346121 A * 11/2022 ........... A01B 79/005  
WO WO2019129333 A1 7/2019

OTHER PUBLICATIONS

Fernando Perez-Sanz, Plant phenomics: an overview of image acquisition technologies and image data analysis algorithms, dated Oct. 3, 2017, pp. 1-35, doi: 10.1093/gigascience/gix092, [online]. Retrieved from the internet <URL: https://www.ncbi.nlm.nih.gov/pmc/articles/PMC5737281/>.

(Continued)

*Primary Examiner* — Arpad Fabian-Kovacs

(57) ABSTRACT

An data processor is configured to identify the component pixels of a harvestable plant component within an obtained image data of plant pixels of the one or more target plants. An edge, boundary or outline of the component pixels is determined. The data processor is configured to detect a size of the harvestable plant component based on the determined edge, boundary or outline of the identified component pixels, along with an adjustment based on analysis of any exposed portions of the harvestable plant component. A user interface is configured to provide a yield indicator based on the detected size of the harvestable plant component.

20 Claims, 18 Drawing Sheets

(51) Int. Cl.
| | |
|---|---|
| *G06V 10/48* | (2022.01) |
| *G06V 10/56* | (2022.01) |
| *G06V 20/10* | (2022.01) |
| *A01D 41/14* | (2006.01) |
| *A01D 45/02* | (2006.01) |
| *G06Q 50/02* | (2012.01) |
| *G06T 7/13* | (2017.01) |
| *G06T 7/168* | (2017.01) |
| *G06T 7/90* | (2017.01) |
| *G06V 10/44* | (2022.01) |
| *G06V 10/75* | (2022.01) |
| *G06V 20/68* | (2022.01) |

(52) U.S. Cl.
CPC .......... *G06V 20/188* (2022.01); *A01D 41/141* (2013.01); *A01D 45/021* (2013.01); *G06Q 50/02* (2013.01); *G06T 7/13* (2017.01); *G06T 7/168* (2017.01); *G06T 7/90* (2017.01); *G06T 2207/30128* (2013.01); *G06T 2207/30188* (2013.01); *G06V 10/44* (2022.01); *G06V 10/75* (2022.01); *G06V 20/68* (2022.01)

(58) Field of Classification Search
CPC .. G06V 20/68; G06T 7/12; G06T 7/13; G06T 7/168; G06T 7/62; G06T 7/90; G06T 2207/30128; G06T 2207/30188; G06Q 50/02; A01D 41/127; A01D 41/141; A01D 45/00; A01D 45/021; A01B 79/005
See application file for complete search history.

(56) References Cited

U.S. PATENT DOCUMENTS

| | | | |
|---|---|---|---|
| 8,073,235 | B2 | 12/2011 | Hausmann et al. |
| 8,488,865 | B2 | 7/2013 | Hausmann et al. |
| 9,282,693 | B2 | 3/2016 | Anderson |
| 9,335,313 | B2 | 5/2016 | Li et al. |
| 10,019,791 | B2 | 7/2018 | Young et al. |
| 10,438,302 | B2 | 10/2019 | Bedoya et al. |
| 10,713,768 | B2 * | 7/2020 | Berghoefer ............... G06T 5/30 |
| 11,064,653 | B2 * | 7/2021 | Zielke ................. A01D 41/127 |
| 2014/0023243 | A1 | 1/2014 | Nagaraj et al. |
| 2014/0230391 | A1* | 8/2014 | Hendrickson ...... G01N 33/0098 702/2 |
| 2016/0084813 | A1* | 3/2016 | Anderson ............ G01N 33/025 702/5 |
| 2016/0084987 | A1* | 3/2016 | Dybro .................... G01V 99/00 702/5 |
| 2017/0024876 | A1 | 1/2017 | Young et al. |
| 2017/0089742 | A1* | 3/2017 | Bruns ................ A01D 41/1273 |
| 2017/0112057 | A1 | 4/2017 | Loukili et al. |
| 2017/0206415 | A1 | 7/2017 | Redden |
| 2019/0019281 | A1 | 1/2019 | Berghoefer et al. |
| 2019/0066234 | A1 | 2/2019 | Bedoya et al. |
| 2020/0072809 | A1 | 3/2020 | Bhanu et al. |
| 2020/0221635 | A1 | 7/2020 | Hendrickson et al. |
| 2020/0334804 | A1* | 10/2020 | Berghoefer ............... G06T 5/30 |
| 2022/0138925 | A1* | 5/2022 | Anderson ................ G06T 7/90 382/110 |
| 2022/0138987 | A1* | 5/2022 | Anderson ............ G06T 7/0004 382/110 |

OTHER PUBLICATIONS

Omni-line Orientors—Bottle Orienting Machine, YouTube Videos, dated Jan. 14, 2019, [online]. Retrieved from the internet <URL: https://www.bing.com/videos/search?q=orienting+bottles&&view=detail&mid=CC05D923BF6B2E432C7DCC05D923BF6B2E432C7D&&FORM=VRDGAR&ru=%2Fvideos%2Fsearch%3Fq%3Dorienting%2520bottles%26qs%3Dn%26form%3DQBVR%26sp%3D-1%26pq%3Dorienting%2520bottles%26sc%3D1-17%26sk%3D%26cvid%3D4AD701805BA04BC5898EA71A42849C05>.

Extended European Search Report and Written Opinion issued in European Patent Application No. 21202271.9, dated Apr. 11, 2022, in 08 pages.

R. Makanza, High-throughput method for ear phenotyping and kernel weight estimation in maize using ear digital imaging, dated Jun. 15, 2018, pp. 1-13, [online]. Retrieved from the internet <URL: https://plantmethods.biomedcentral.com/articles/10.1186/s13007-018-0317-4>.

Nathan D. Miller, A robust, high-throughput method for computing maize ear, cob, and kernel attributes automatically from images, dated Nov. 19, 2016, pp. 169-178, doi: 10.1111/tpj.13320, [online]. Retrieved from the internet <URL: https://onlinelibrary.wiley.com/doi/full/10.1111/tpj.13320>.

Maize Kernel-Ear-Cob Analysis, pp. 1-3, [online]. Retrieved from the internet <URL: http://www.plant-image-analysis.org/software/maize-kernel-ear-cob-analysis>.

Cecilia Di Ruberto, Generalized Hough Transform for Shape Matching, International Journal of Computer Applications (0975-8887), dated Jun. 2012, pp. 19-22, DOI:10.5120/7312-9885, [online]. Retrieved from the internet <URL: https://pdfs.semanticscholar.org/9066/a8bd2d4dea87897401bee57b6955d6681688.pdf>.

Ignacio Ciampitti, Kansas Soybeans: Conditions Before Harvest—Pod Shattering, dated Oct. 17, 2018, pp. 1-5, [online]. Retrieved from the internet <URL: https://agfax.com/2018/10/17/kansas-soybeans-conditions-before-harvest-pod-shattering/>.

Tracy Frank, ND native's idea for improved corn husking leads to creation of major company, dated Sep. 26, 2014, pp. 1-9, [online]. Retrieved from the internet <URL: https://www.inforum.com/business/3566757-nd-natives-idea-improved-corn-husking-leads-creation-major-company>.

Michael P. Pound, Deep machine learning provides state-of-the-art performance in image-based plant phenotyping, dated Aug. 23, 2017, pp. 1-18, doi: 10.1093/gigascience/gix083, [online]. Retrieved from the internet <URL: https://www.ncbi.nlm.nih.gov/pmc/articles/PMC5632296/>.

Jinglei Zhang, Research on Energy Saving Routing Algorithm of Cluster Wireless Sensor Networks, 3rd International Conference on Electromechanical Control Technology and Transportation (ICECTT 2018), pp. 492-497, ISBN: 978-989-758-312-4, [online]. Retrieved from the internet <URL: http://www.scitepress.org/Papers/2018/69727/69727.pdf>.

Video A&K Seed Corn Husker, YouTube Videos, dated Nov. 12, 2014, [online]. Retrieved from the internet <URL: https://www.youtube.com/watch?v=dqi21MxkctU>.

Hughes Sweet Corn Husker, YouTube Videos, dated Jan. 5, 2009, [online]. Retrieved from the internet <URL: https://www.youtube.com/watch?v=-l9z9fqan9U>.

Sweet Corn Husker Machine, [online]. Retrieved from the internet <URL: https://www.amisyfoodmachine.com/food-machinery/fresh-corn-husker-machine.html>.

Real Time Ellipse Detection on Mobile Devices, YouTube Videos, dated Jul. 16, 2013, [online]. Retrieved from the internet <URL: https://www.youtube.com/watch?v=PYUjs-K01Ss>.

2D Bounded Hough Transform-Face Tracking, YouTube Videos, dated Jan. 18, 2008, [online]. Retrieved from the internet <URL: https://www.youtube.com/watch?v=ONeGFmu1WM8>.

Extended European Search Report and Written Opinion issued in European Patent Application No. 21202269.3, dated Apr. 21, 2022, in 07 pages.

Extended European Search Report and Written Opinion issued in European Patent Application No. 21202276.8, dated Mar. 11, 2022, in 08 pages.

\* cited by examiner

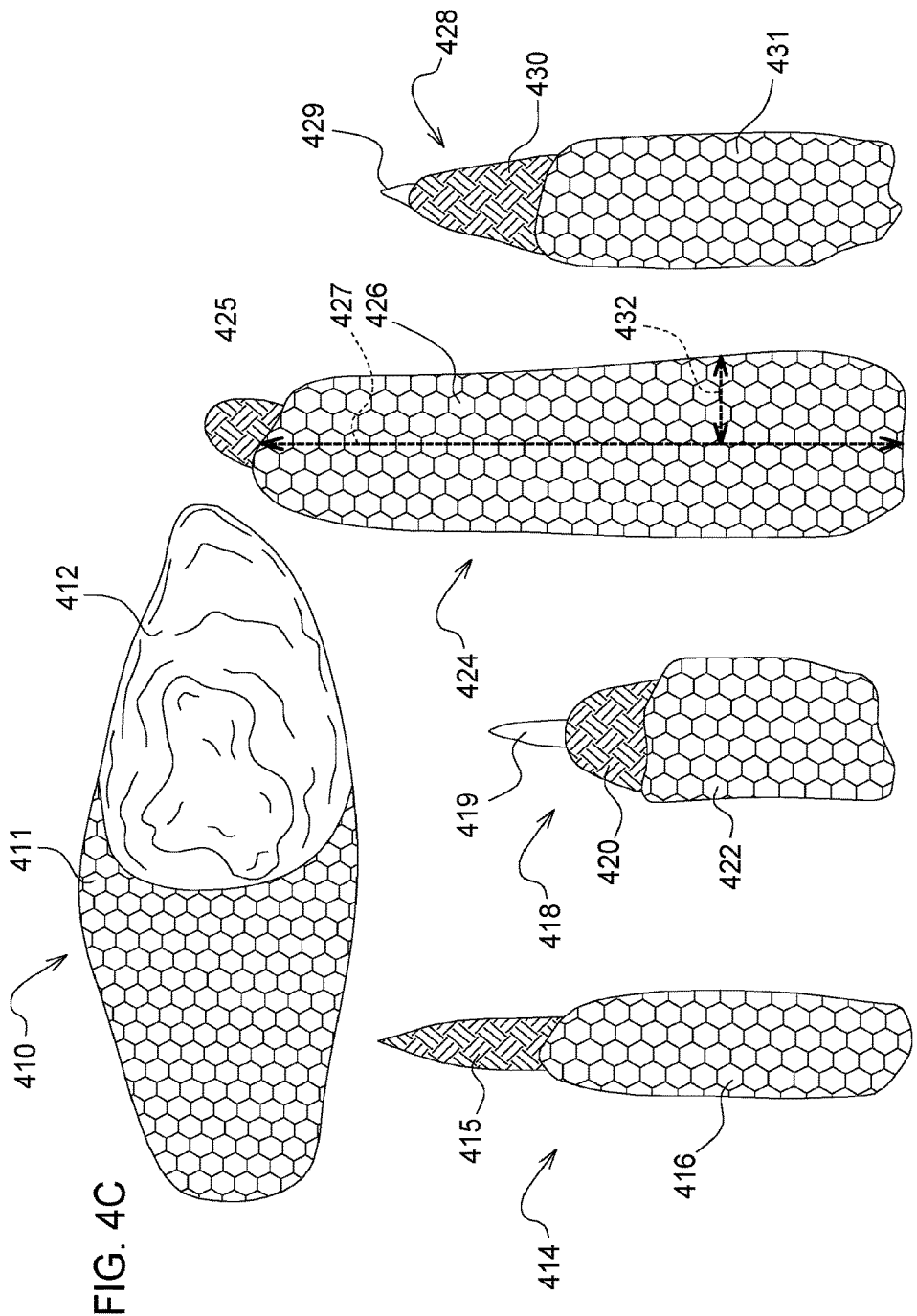

METHOD AND SYSTEM FOR OPTICAL YIELD MEASUREMENT OF A STANDING CROP IN A FIELD

RELATED APPLICATION

This document (including the drawings) claims priority and the benefit of the filing date based on U.S. provisional application No. 63/198,592, filed Oct. 29, 2020 under 35 U.S.C. § 119 (e), where the provisional application is hereby incorporated by reference herein.

DISCLOSURE

This disclosure relates to a method and system for optical yield measurement of a standing crop in a field.

BACKGROUND

In certain prior art, a harvester or combine uses a yield monitor to estimate yield of a crop as a yield per land unit during harvesting or after it is harvested in the field. For example, the yield monitor may comprise a strike plate that is displaced (e.g., proportionally) in response to the volume, mass or amount of harvested grain that strikes the strike plate in a clean grain elevator; hence, changes an electrical signal provided by one or more sensors (e.g., piezoelectric sensor). However, the yield monitor does not generally provide per plant yield data or any yield data, or associated quality data, that are associated with field surveys prior to harvesting operations (e.g., that are destructive to the plants in the field). Accordingly, there is a need for a method for non-destructive, optical yield measurement of a standing crop in a field.

SUMMARY

In accordance with one embodiment, a method or system for estimating yield of a standing crop in a field comprises an imaging device for obtaining image data associated with one or more target plants in one or more rows of the standing crop in the field. An electronic data processor is configured to estimate a spatial region of interest of plant pixels of one or more target plants in the obtained image data for a harvestable plant component and its associated harvestable plant component pixels of the harvestable plant component. The electronic data processor is configured to identify the component pixels of a harvestable plant component within the obtained image data of plant pixels of the one or more target plants. An edge, boundary or outline of the component pixels is determined. The data processor is configured to detect a size of the harvestable plant component based on the determined edge, boundary or outline of the identified component pixels. A user interface is configured to provide the detected size of the harvestable plant component for the one or more target plants as an indicator of yield of the one or more plants or standing crop in the field.

BRIEF DESCRIPTION OF THE DRAWINGS

FIG. 4C is an illustrative image of a hypothetical diseased ear of corn or maize with material corn earworm damage.

FIG. 4D is an illustrative image of a hypothetical stress-damaged ear of corn or maize.

FIG. 4E is an illustrative image of a hypothetical abnormal, undersized ear of corn or maize.

FIG. 4F is an illustrative image of another hypothetical abnormal, stress-damaged ear of corn or maize.

FIG. 4G is an illustrative image of yet another hypothetical abnormal, stress-damaged ear of corn or maize.

DETAILED DESCRIPTION OF PREFERRED EMBODIMENTS

As used in this document, adapted to, arranged to or configured to means that one or more data processors, logic devices, digital electronic circuits, delay lines, or electronic devices are programmed with software instructions to be executed, or are provided with equivalent circuitry, to perform a task, calculation, estimation, communication, or other function set forth in this document.

Figure 1A:
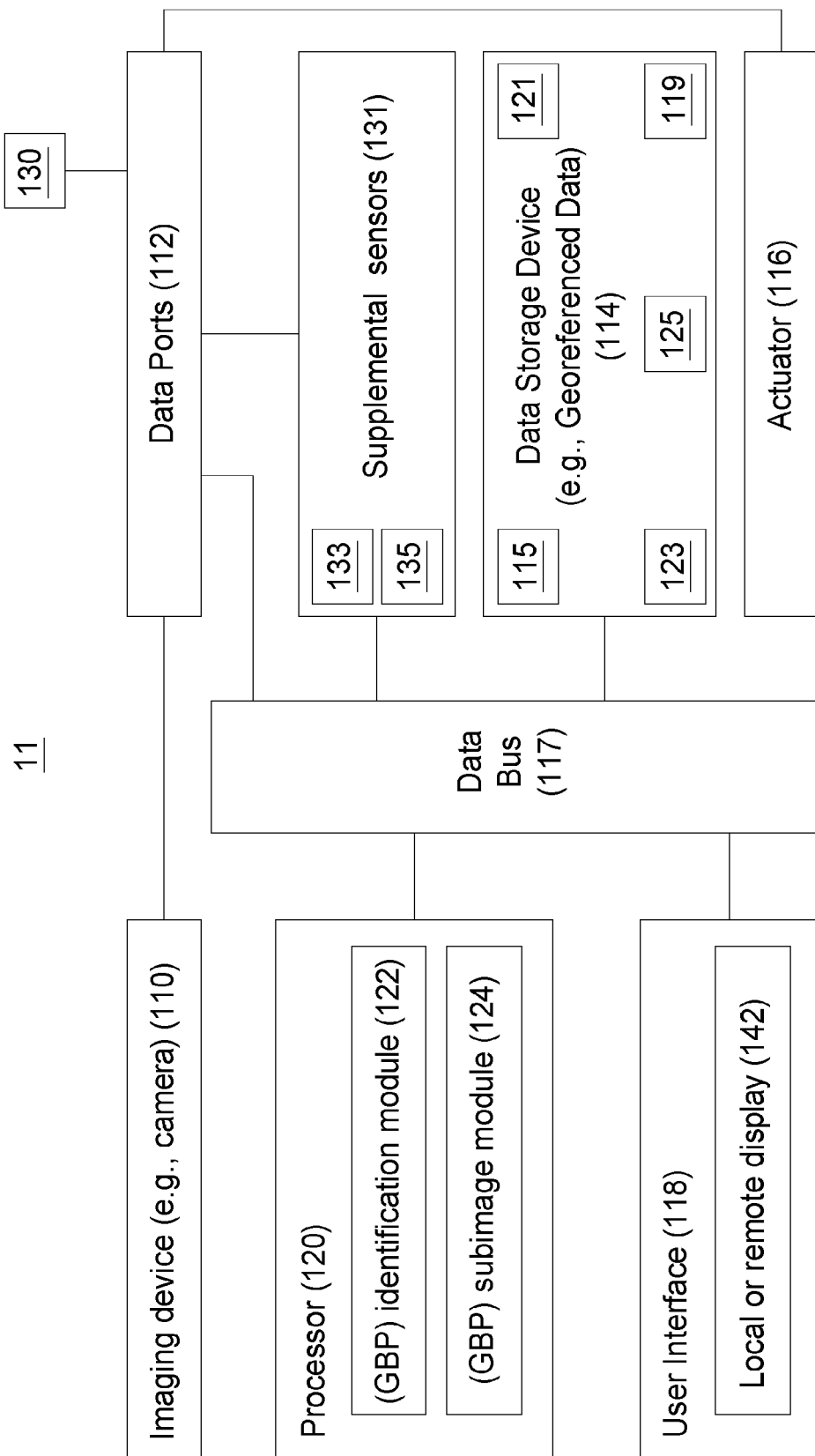
FIG. 1A is a block diagram of one embodiment of a system for estimating yield of a standing crop in a field.

In one embodiment, in FIG. 1A the system 11, which supports optical yield measurement of a standing crop in a field, comprises an electronic data processor 120, a user interface 118, a data storage device 114, and data ports 112 that are coupled to a data bus 117. The electronic data processor 120, the user interface 118, the data storage device 114 and the data ports 112 may communicate with each other over a data bus 117.

In certain embodiments, standing crops comprise any cultivated crops, including but not limited to any of the following: large grains, such as corn or maize; small grains such as wheat, rice, oats, rye, and barley; fiber crops such as cotton, jute, industrial hemp and flax; oilseeds, such as safflower and sunflower; and legumes, such as alfalfa, clover, soybeans, soya, lentils, carob, peas, and beans. In some examples, the economically valuable part of the crop may be all or mostly surrounded by a husk, hull, or other protective structure. Standing crops are typically harvested with a crop harvester such as combine, cotton picker, or similar machine.

In one configuration, the electronic data processor 120 comprises one or more of the following: a microprocessor, a multi-core microprocessor, a microcontroller, a programmable logic device, a programmable gate array, an arithmetic logic unit, a Boolean logic unit, an electronic logic circuit or system, a digital circuit, a digital signal processor (DSP), and application specific integrated circuit (ASIC) or another data processing device. In one embodiment, the electronic data processor 120 can execute software instructions, logic, code, or modules that stored in the data storage device 114. For example, the electronic data processor 120 can execute software instructions to facilitate, support, incorporate, call, configure or emulate any of the following: image processing devices, color differentiation module, shape differentiation module, identification module 122 (e.g., pixel identification module or grain-bearing portion identification module), and the like.

In one embodiment, the data storage device 114 may comprise one or more of the following: electronic memory, nonvolatile electronic memory, shift registers, memory stacks, registers, nonvolatile random access memory, a magnetic storage device, an optical storage device, or any other device for storing and retrieving digital data and/or analog data.

In one embodiment, the user interface 118 comprises one or more of the following: a keypad, a keyboard, a switch, console, a pointing device (e.g., any electronic mouse), a touch pad, a touch screen, an electronic display 142 or another device that supports the input and output of data into the data processor and data storage device 114. The electronic display may be configured as a liquid crystal display, a light emitting diode (LED), a plasma display, a resistive or capacitive touch screen display, or another display.

Each data port 112 may comprise a device, such as buffer memory and an electronic transceiver for communicating data messages between the data bus 117 and a network element, a location-determining receiver 130, one or more sensors, and one or more actuators 116. One or more of the following can be coupled to the data ports 112: a location-determining receiver 130, one or more sensors, and one or more actuators 116. For example, the location-determining receiver 130, one or more sensors, and one or more actuators 116 are coupled to the data ports 112 via a communications line (e.g., Ethernet), or a communications network, such as the Internet or a wireless communications network (e.g., cellular phone network, or high-bandwidth smartphone data communications wireless network).

In one configuration, the imaging device 110 comprises a stereo vision imaging device 110 or digital stereo vision camera with image data processing. Further, the imaging device 110 may operate in one or more frequency spectrums or bandwidths, such as one or more of the following: humanly visible light, near-infrared light, infra-red light and ultraviolet light. The imaging device 110 is coupled to one or more data ports 112. In an alternate embodiment, the imaging device 110 may comprise a monocular imaging device 110, a video imaging device 110.

In one embodiment, a location-determining receiver 130 is coupled to at least one of the data ports 112. A location-determining receiver 130 may comprise a Global Navigation Satellite System (GNNS) receiver, such as a Global Positioning System (GPS) receiver that is associated with a wireless communications device for receiving correction data (e.g., differential correction data, or precise point position (PPP) correction data, or Real-time Kinematic (RTK) correction data). The location-determining receiver may provide position data (e.g., in two or three dimensional geographic coordinates), motion data (e.g., velocity data/acceleration data), heading or yaw data, among other things.

In an alternate embodiment, the system 11 may comprise additional or optional sensors, such as accelerometers (e.g., multi-axis accelerometer), an inertial management unit (IMU), or both to estimate tilt angle, roll angle and yaw angle (e.g. collectively attitude) of the imaging device 110, the system 11 or the vehicle on which the imaging device 110 or system 11 is located to provide data to align the collected image data with real-world or corrected coordinates in two or three dimensions, such as point clouds or constellations of collected image data.

In still other alternate embodiments, the system 11 may comprise one or more supplemental sensors 131, such as a yield monitor 133 (e.g., secondary yield sensor), a moisture sensor 135, or both. For example, the yield monitor 133 may detect aggregate yield of harvester or combine for a set of rows or row units (e.g., all row units). Further, a moisture sensor 135 supports the yield monitor 133 such that the yield of harvested crop can be estimated, corrected or augmented by moisture sensor data associated with soil moisture, crop leaf moisture, or harvested plant components (e.g., ears of maize, corn, pods of legumes, or bolls of cotton).

For example, a yield monitor 133 may comprise one or more of the following: harvested material sensor; a harvested material moisture sensor; an impact sensor comprising a piezoelectric sensor, a piezoresistive sensor, a strain gauge or a load cell that is configured to detect displacement and/or force of an impact member; a potentiometer or resistive sensor that is configured to detect displacement and/or force of an impact member; an electromagnetic transmitter and electromagnetic receiver (e.g., microwave transmitter and receiver and associated antennas or antenna arrays) that are configured to measure phase changes and attenuation associated with volume or mass of grain in a sampled or tested volume.

Figure 7:
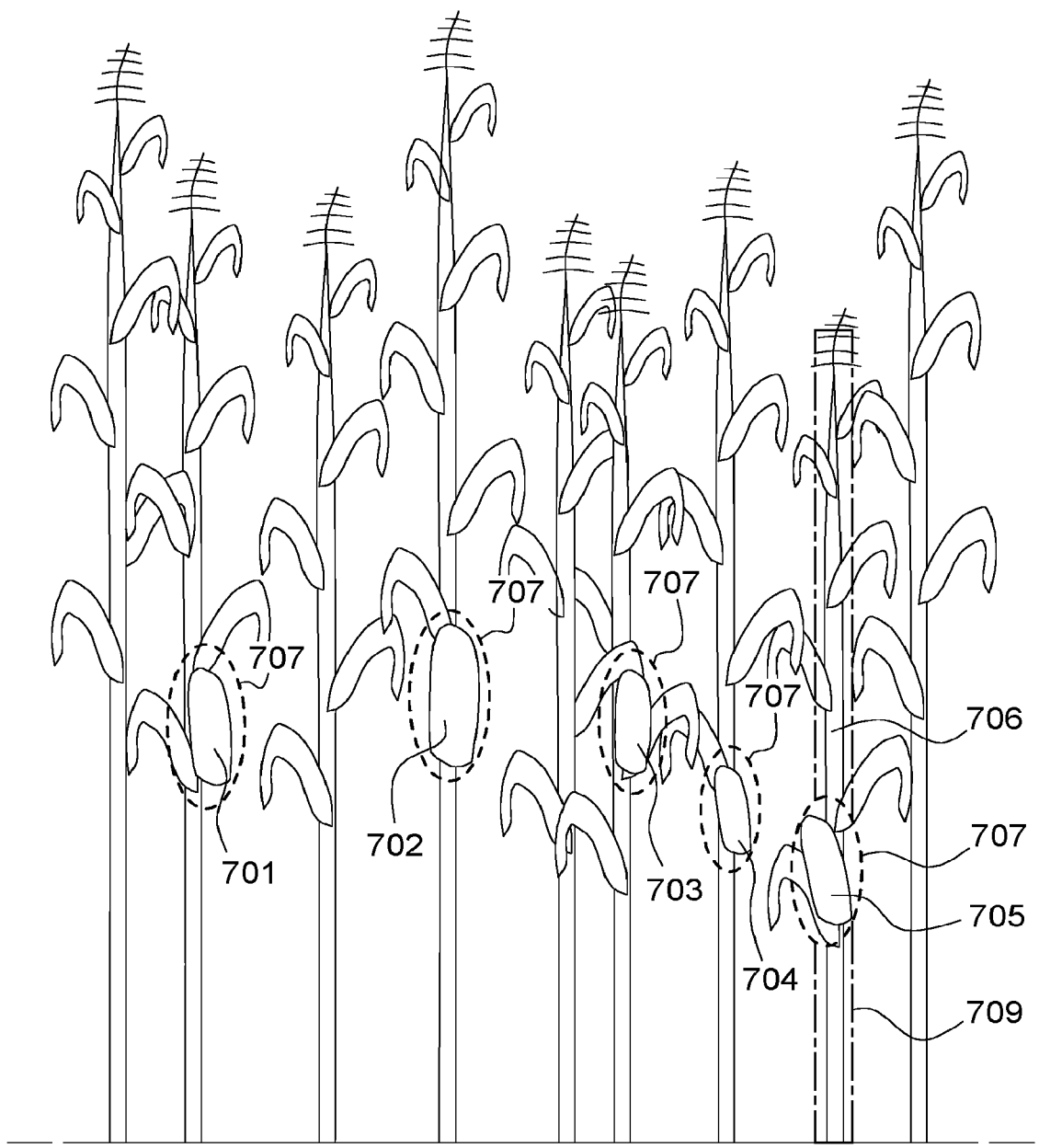
FIG. 7 is a representative example of possible collected image data (or reference/training image data) that indicates the respective locations of identifiable, harvestable plant components in a field or row of plants, where the harvestable plant components comprise ears of corn or maize.

In FIG. 1A, one or more actuators 116 (e.g., electromechanical actuators) are configured to control: (a) a gimbal to maintain a stable orientation for collecting image data; (b) an adjustable robotic arm (e.g., in compound angles or along multiple orthogonal axes) to adjust the pan, tilt, lens setting, zoom, attitude, roll angle, tilt angle and yaw angle of the imaging device 110, or both. In some configurations, an imaging device 110 is located at the distal end of an arm or boom that can be moved in a multiple dimensions to obtain visible direct sight path or a line-of-sight view of harvestable plant components, such as ears of corn or maize on standing crop as illustrated in FIG. 7.

Figure 1B:
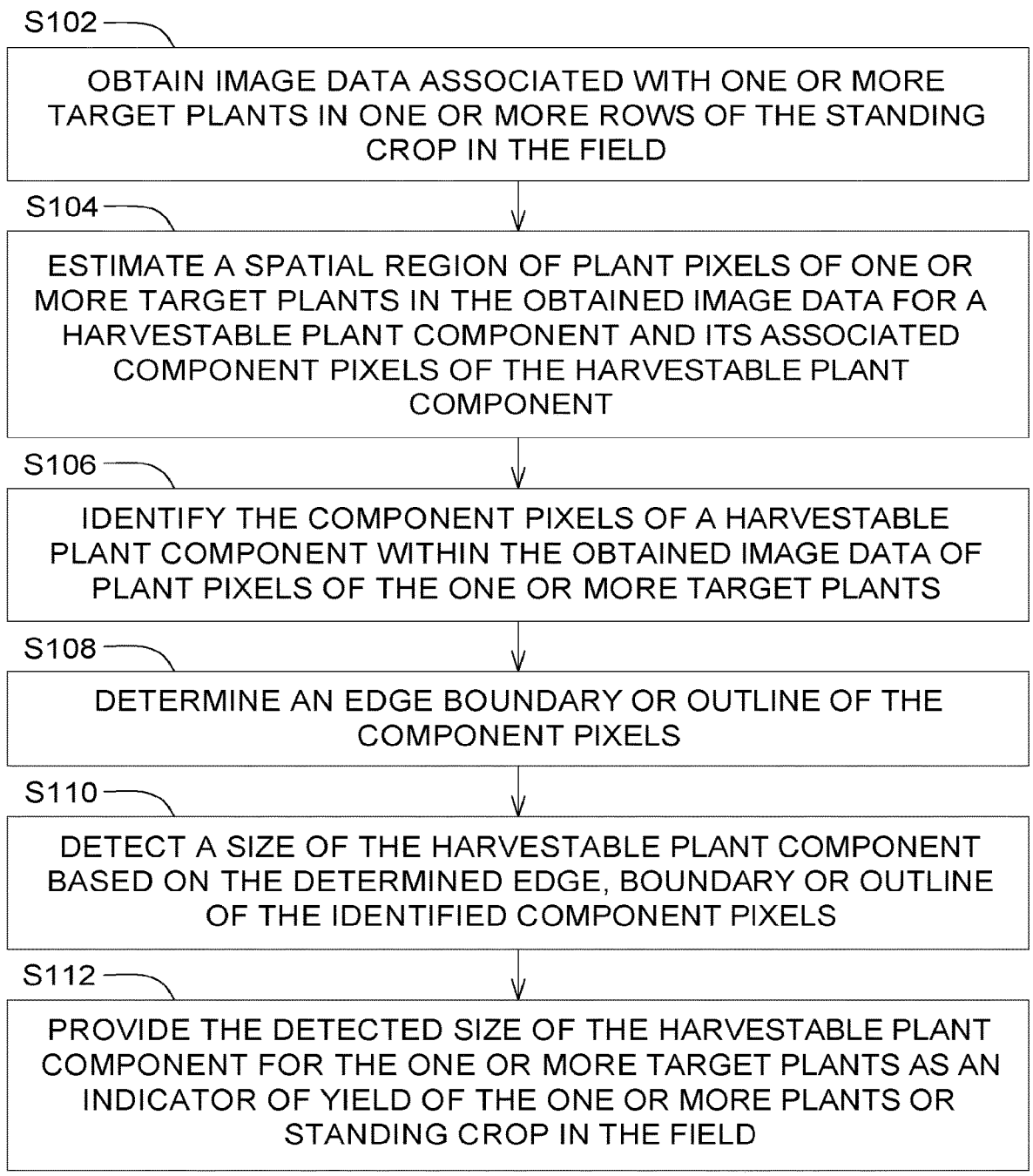
FIG. 1B is a flow chart of one embodiment of a method for estimating yield of a standing crop in a field.

In accordance with one embodiment as illustrated in FIGS. 1A and 1B, the method for estimating yield or a yield metric of a standing crop in a field begins with step S102.

In step S102, an imaging device 110 (e.g., imaging sensors) is configured to obtain or to collect image data associated with one or more target plants (210a, 210b, 210c and 210d in FIG. 2) in one or more rows of the standing crop in the field.

In step S104, an electronic data processor 120 is configured to estimate a spatial region of plant pixels of one or more target plants in the obtained image data for a harvestable plant component (212a, 212b, 212c and 212d in FIG. 2) and its associated component pixels of the harvestable plant component. For example, the harvestable plant component may comprise a grain bearing portion (GBP) of a plant, an ear, a grain head for a grain, corn, maize, wheat, rye, oats, rice, sorghum, cereal or quasi-cereal plant.

In step S106, the electronic data processor 120 or image processing module 115 is configured to identify the component pixels of a harvestable plant component within the obtained image data of plant pixels of the one or more target plants. For example, the component pixels refer to pixels of the harvestable plant component that are identified or classified by color differentiation or other image processing techniques with respect to background pixels, leaf pixels, stem or stalk pixels, or other portions of the crop plant. Other image processing techniques may include classification of pixels by any of the following: image segmentation, clustering analysis of point clouds of pixels or constellations of pixels in three dimensional spatial representation, edge detection, size differentiation, and shape differentiation, and neural networks or artificial intelligence algorithms that use any of the foregoing image processing techniques.

In step S108, the electronic data processor 120, an image processing module 115, or an edge detector 121 determines an edge, boundary or outline of the component pixels of the harvestable plant component. First, the image processing module 115 may comprise an image normalizer or image scaler that normalizes and scales the collected images to imaging device coordinates or real world coordinates. Further, the image processing module 115 may normalize, scale, rotate, de-warp, correct, and/or transform the collected images to imaging device coordinates or real world coordinates. Second, the image processing module or edge detector 121 applies edge detection, such as linear edge detector or Hough transform, to the normalized, scaled, rotated, de-warped, corrected and/or transformed images to detect the transition region and boundary of the component pixels of the harvestable plant components associated with one or more crop plants in the field.

In step S110, the data processor 120, image processing module 115 and size estimator is configured to detect or estimate a size of the harvestable plant component based on the determined edge, boundary or outline of the identified component pixels. For example, after the image processing module 115 normalizes and scales the collected images to imaging device coordinates or real world coordinates, the image processing module 115 and/or size estimator may estimate the size or volume of the harvestable plant component along one or more orthogonal axes or in polar coordinates.

In one embodiment in step S112, a data processor 120 or yield estimator 119 is configured to provide the estimated or detected size of the harvestable plant component (e.g., grain bearing portion or ear of a crop plant) on a user interface 118 (e.g., an electronic display 142) for the one or more target plants as an indicator of yield of the one or more plants or standing crop in the field. The detected size may comprise any of the following: length, width and height of a harvestable plant component, a volume of a harvestable plant component, a length (e.g., along an ear longitudinal axis 427 in FIG. 4F) and diameter or radius (e.g., ear radius 432 substantially perpendicular to the ear longitudinal axis 427 in FIG. 4F) of a harvestable plant component, an outline, silhouette or shape of the harvestable plant component, a count of seeds (e.g., kernels) of the harvestable plant component, a grain size of a harvestable plant component or other metrics.

In some embodiments, the detected size may be associated with corresponding estimated yield metrics in a look-up table, chart, database, file or inverted file, where the corresponding yield metrics may comprise a per plant yield or individual plant yield, a per row yield, a sectional yield associated with a header of harvester or combine, an aggregate yield associated with a land unit area, or yield per land unit area. A yield metric may comprise any of the following: per plant yield or individual plant yield, per row yield, relative yield per plant, biomass estimate, plant height estimate, relative yield per row, or relative yield per section of a harvester or combine, or aggregate yield per plant area unit.

In an alternate embodiment, the look-up table or database of detected size versus yield metric may be replaced by a machine learning (ML) system or artificial intelligence algorithm that outputs a yield metric in response to the input of a detected size of the harvestable plant component, alone or together with location or position data.

In practice, the data processor 120 or yield estimator 119 may provide a per plant yield, a per row yield, a sectional yield for one or more rows of harvester or combine; or even an aggregate yield or relative yield per land unit (e.g., acre or hectare). For example, in step S112, a data processor 120 or yield estimator 119 is configured to provide, via the user interface, a yield metric derived from, consistent with, or indicative of a per-plant yield based on a detected size of the harvestable plant component for the one or more target plants as an indicator of yield of the one or more plants or standing crop in the field, where the yield metric comprises aggregate yield, a sectional yield, a per row yield derived, at least partially, from the per-plant yield. The per-plant yield can form a building block or modularly expandable basis from which to derive or estimate a the corresponding aggregate yield, sectional yield or per row yield; particularly, where image data of sampled harvestable plant components are available for statistically significant portions of the area from which the data processor 120 or yield estimator 119 is configured to estimate the aggregate yield, sectional yield or row yield.

The per-plant yield or another yield metric may be associated with a corresponding position or location in the field, such as a relative position or an absolute position (e.g., three-dimensional geographic coordinates from the location the determining receiver 130). For example, the data processor 120 or yield estimator 119 may generate or provide a yield map versus three-dimensional position (GPS coordinates or a georeferenced yield map) that provides individual plant yield data or that aggregates yield data from multiple plants. The user interface 118 or display 142 user interface 118 may display or present the yield map versus three-dimensional position to an end user or another yield metric.

Further, in an alternate embodiment, the electronic data processor 120 may generate an alert, alarm or notice, command or control signal based on the estimated yield metric meeting a threshold yield metric or not meeting a threshold yield metric. In one example, if the electronic data processor 120 generates an alert, alarm or notice, command or control signal (e.g., for output or display by the user interface 118) based on the estimated yield metric meets or exceeds a threshold yield metric, locations or positions of the plants contributing to the observed yield metric may be used to generate a geofenced boundary or region that has a high priority for harvesting by a harvester or a combine. Conversely, if the electronic data processor 120 generates an alert, alarm or notice, command or control signal based on the estimated yield metric does not meet or exceed a threshold yield metric, locations or positions of the plants contributing to the observed yield metric may be used to generate a geofenced boundary or region (e.g., for output or display by the user interface 118 or for input to a vehicle guidance system that directs the steering, heading or yaw of the vehicle during harvesting operations) that has a low priority for harvesting by a harvester or a combine, or that is not harvested.

In one embodiment, the harvestable plant component comprises one or more of the following: a grain bearing portion of the one or more target plants, an ear of corn or maize of the one or more target plants, a pod of legumes, a fiber bearing portion, or cotton boll. In an alternate embodiment, the harvestable plant component comprises one or more of the following: a seed pod of the one or more target plants, such as a legume seed pod of the one or more target plants.

The electronic data processor 120, differentiation module, or identification module 122 is adapted to or configured to distinguish component pixels from background pixels, by color differentiation, edge detection, and shape detection obtained image data. Further, the background pixels may comprise weed pixels or ground pixels of weeds or grounds around the one or more target plants, where the image data is structured as multi-dimensional constellation or cloud of points for the edge detection and shape detection.

In alternate embodiments where the imaging device 110 comprises a stereo imaging device 110 or where three-dimensional clouds of plant and background pixels are available, the electronic data processor 120 may be capable of identifying additional background pixels, such as plant pixels from adjacent crop plants, as opposed to weeds, where such plant pixels comprise of pixels that represent crop leaves, stalk, or ears from an adjacent or next plant in a row or adjoining row.

The electronic data processor 120, differentiation module, or identification module 122 is configured to identify the component pixels comprises distinguishing component pixels from background pixels by classification of obtained image data via an artificial intelligence data processing algorithm, where the image data is structured as a three-dimensional constellation or cloud of points, and where the artificial intelligence data processing algorithm is or was trained with a reference image data comprising three-dimensional constellation or cloud of points.

In one embodiment, an image classifier 123, an image classifier 123 associated with neural network or artificial intelligence algorithm, an image shape detector, a linear edge detector 121 (e.g., Hough transform module), a shape differential module, a color differentiation module, or the electronic data processor 120 is configured process collected image data in accordance with one or more of the following procedures/techniques: (a) to identify pixels of the plant (e.g., plant tissue) of the crop plants or pixels of harvestable plant components in the collected image data or in a region of interest of the collected image data; (b) to identify pixels of harvestable plant components (e.g., corn kernels, husk, silk at the end of an ear, or exposed tip of an ear) in the collected image data or in a region of interest of collected image data, or within the identified plant pixels; (c) to differentiate or classify plant pixels (e.g., plant tissue pixels) of crop plants and/or harvestable plant component pixels from background pixels (in the collected image data), such as pixels or sub-images of weeds, non-crop plants, volunteer plants, soil, clay, top soil, sand, sky, annual plants, perennial plants, bushes or trees, animals, persons, equipment, obstacles, or other objects; (d) to classify the pixels (or voxels) of the harvestable plant components based on a yield per plant metric and/or a yield quality of the harvestable plant components.

As used throughout this document, an image processing module 115 may comprise any of the following: the image classifier 123, the image shape detector, the liner edge detector 121, shape differentiation module, or color differentiation modules. The image classifier 123, the image shape detector, the liner edge detector 121, shape differentiation module, or color differentiation modules may comprise software instructions or software modules that are stored in the data storage device 114 for execution by the electronic data processor 120.

In alternate configurations, the image classifier 123, an image classifier 123 associated with neural network or artificial intelligence algorithm, an image shape detector, a linear edge detector 121 (e.g., Hough transform module), a shape differential module, a color differentiation module, or the electronic data processor 120 may operate on voxels that are pixels associated with three-dimensional coordinates or volume of image clouds or constellations, such as where the image data is collected stereo image data.

The image classifier 123, the image shape detector, the liner edge detector 121, shape differentiation module, or color differentiation modules may comprise software instructions or software modules that are stored in the data storage device 114 for execution by the electronic data processor 120 to perform one or more of the following: (1) distinguishing plant pixels, including but not limited to component pixels, from background pixels by color differentiation, edge detection and shape detection of the obtained image data to reduce or eliminate background pixels for later identification of the component pixels; or (2) distinguishing the component pixels from the previously distinguished plant pixels.

In another embodiment, the image classifier 123, the image shape detector, the liner edge detector 121, shape differentiation module, or color differentiation modules may comprise software instructions or software modules that are stored in the data storage device 114 for execution by the electronic data processor 120 to perform one or more of the following in conjunction with identifying component pixels of harvestable plant components: (1) initially or preliminarily distinguishing plant pixels, including but not limited to component pixels, from background pixels by color differentiation, edge detection and shape detection of the obtained image data to reduce or eliminate background pixels for later identification of the component pixels; and (2) secondarily distinguishing the component pixels from the initially or preliminary distinguished plant pixels.

The electronic data processor 120, a size detection module, or a scaling module may detect, estimate or scale of the size of the harvestable plant component may comprises converting image coordinates of the obtained image data into real-world coordinates to represent the size, volume, or spatial dimensions (e.g., in two or three dimensional space, such as polar coordinates or Cartesian coordinate system) of the harvestable plant component as real-world dimensions. For example, the size detection module or scaling module may comprise software or software instructions that are stored in the data storage device 114 for execution by the electronic data processor 120.

In some configurations, the electronic data processor 120 or a yield estimator 119 may estimate an aggregate yield for at least a portion of the field, or an entire field, based on iteratively obtaining image data of one or more target plants throughout the field such that the target plants represent a statistically significant sample size for the field and iteratively detecting of the size of the harvestable plant component for one or more target plants throughout the field for the iteratively obtained image data. For example, the yield estimator 119 may comprise software or software instructions that are stored in the data storage device 114 for execution by the electronic data processor 120.

The electronic data processor 120 or yield estimator 119 may estimate a plant yield, a plant row field per lineal dimension (e.g., in lineal meters or in lineal yards or feet), an aggregate yield for at least a portion of the field, or an entire field in accordance with various techniques, which may be applied separately or cumulatively.

Under a first technique, the electronic data processor 120 or yield estimator 119 is configured to estimate of the size of the harvestable plant component comprises a length, height or width of the outline, edge or boundary of the harvestable plant component.

Under a second technique, the electronic data processor 120 or yield estimator 119 is configured to estimate the size of the harvestable plant component comprises a diameter, length or width of the harvestable plant component, where the harvestable plant component comprises an ear of corn or maize.

Under a third technique, the electronic data processor 120 or yield estimator 119 is configured to detect the size of the harvestable component comprises an estimated volume of harvestable plant component based on multiple dimensions of component pixels that lie an outline, edge or boundary of the harvestable plant component; where the dimensions are determined as one or more differences between the coordinates of component pixels represent a cloud or constellation of three-dimensional points on the outline, edge or boundary.

Under a fourth technique, the electronic data processor 120 or the yield estimator 119 transmits the estimated aggregate yield for at least a portion of the field to an electronic data processing device associated with a yield monitor on a combine or harvester for calibrating, correcting or augmenting a secondary aggregate yield estimated by the yield monitor.

Under a fifth technique, the electronic data processor 120 or the yield estimator 119 transmits wirelessly the estimated aggregate yield for at least a portion of the field to an electronic data processing device configured: (a) to determine a prescription (e.g., preliminary prescription) for applying nutrients, nitrogen, potassium, phosphorous, minerals, fungicide, herbicide, pesticide or other crop inputs, and/or (b) to communicate with or to control an applicator, distributor, sprayer, chemical application machine or another device for distributing materials (e.g., chemicals or fertilizer) in accordance with the determined prescription (e.g., preliminary prescription that can be adjusted or overridden by the operator based on the operator's observation of actual field conditions, such as temperature, wind and humidity).

In one embodiment, the electronic data processor 120 or image processing module 115 is configured: (a) to identify a region of interest in the collected image data or to reduce the search space for identification or characterization of the harvestable plant component, or (b) to estimates the spatial region of the harvestable plant component in the pixels or voxels of collected image data, or within the pixels or voxels of crop plant data. The identification of the region of interest or search space, or estimation of the spatial region can be conducted in accordance with one or more procedures, which may be applied separately, or cumulatively.

Under a first procedure, estimating a plant height of the one or more target plants in the obtained or collected image data and a corresponding component height range for a harvestable plant component in the obtained image data to reduce a search space size in the obtained image data for a component pixels of a harvestable plant component.

Under a second procedure, the electronic data processor 120 or image processing module 115 searches for the harvestable plant component in a pixel or voxel search space (of the collected image data or bounded plant pixel data) defined by or bounded by a plant top (or peak plant height) to a plant bottom at the ground.

Under a third procedure, the electronic data processor 120 or image processing module 115 searches for the harvestable plant component (of the collected mage data or bounded plant pixel data) by searching downward or upward in a pixel or voxel search space defined by or bounded by a plant top (or peak plant height) to a plant bottom at the ground.

Under a fourth procedure, the electronic data processor 120 or image processing module 115 searches for a harvestable plant component in the collected image data or bounded plant pixel data: (a) manually by user input that adjusts the search space for a corresponding crop type, and/or maturity level, or (b) automatically based on where system is finding harvestable portion in the collected image data, or (c) by machine learning or other artificial intelligence procedures that classifies or outputs a sub-image of the harvestable plant component (e.g., as a three-dimensional image cloud or constellation of pixel values and corresponding spatial positions in image or real-world coordinates).

Under a fifth procedure, the electronic data processor 120 or image processing module 115 searches the harvestable plant component height range (in collected image data or bounded plant pixel data) is based on a fraction, ratio or percentage of average, mean, median or mode plant height of the one or more target plants.

Under a sixth procedure, the electronic data processor 120 or image processing module 115 searches for harvestable plant component height range (in the collected image data or bounded plant pixel data) is stored in a data storage device 114 as a look-up table, an inverted file, a data base, or another data structure that comprises a plant identifier and a corresponding height represented as an absolute height or ratio, fraction, or percentage of total plant height, where the data storage device 114 is in communication with a user interface 118 for entering or inputting, into an electronic data processing system, a crop type selected from the group consisting of maize, corn, wheat, oats, barley, small grains, soybeans, beans, and legumes.

Figure 1C:
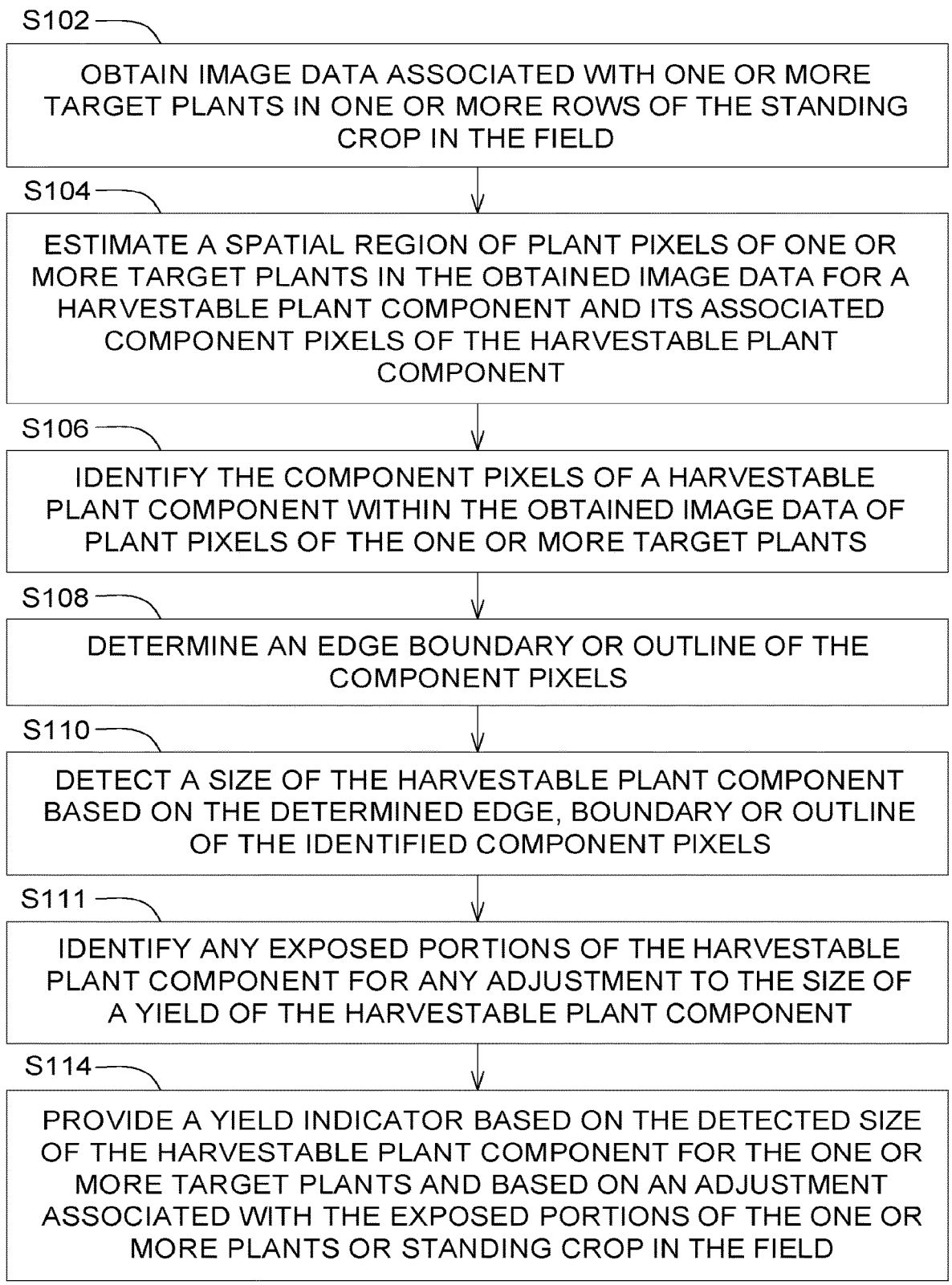
FIG. 1C is a flow chart of another embodiment of a method for estimating yield of a standing crop in a field.

In accordance with one embodiment as illustrated in FIGS. 1A and 1C, the method for estimating yield or a yield metric of a standing crop in a field begins with step S102. Like steps or features are indicated by like reference numbers; details of the steps hitherto set forth in conjunction with FIG. 1B can be applied to FIG. 1C as if fully set forth to accompany the following explanation of FIG. 1C.

In accordance with one embodiment, in step S102 in FIG. 1C an imaging device 110 is configured to obtain or collect image data associated with one or more target plants in one or more rows of the standing crop in the field.

In step S104, an electronic data processor 120 is configured to estimate a spatial region of interest of plant pixels of one or more target plants in the obtained image data for a harvestable plant component and its associated harvestable plant component pixels of the harvestable plant component.

In step S106, the electronic data processor 120 is configured to identify the component pixels of a harvestable plant component within the obtained image data of plant pixels of the one or more target plants.

In step S108, an edge, boundary or outline of the component pixels is determined consistent with FIG. 1B.

In step S110, the data processor 120 is configured to detect a size of the harvestable plant component based on the determined edge, boundary or outline of the identified component pixels (of the harvestable plant component).

In step S111, the data processor 120 is configured to identify any exposed portions (e.g., kernels, seeds, or fiber volume) of grain, maize, corn, fiber volume/strands, or seeds, beans, legumes, or oilseeds, for any adjustment to the size or a yield of the harvestable plant component, where the harvestable plant component comprises an ear of maize or corn, grain, cereal, a small grain, a legume seed pod, a seed pod, or a boll.

In step S114, a data processor 120 or yield estimator 119 is configured to provide a yield indicator (e.g., for display 142 to an end user or vehicle operator via a user interface 118 or electronic display 142) based on the detected size of the harvestable plant component for the one or more target plants and base on an adjustment associated with the exposed portions, of the one or more plants or standing crop in the field.

In one embodiment, the electronic data processor 120 or yield estimator 119 is configured to adjust the size or the yield of the harvestable plant component for the one or more target plants based on an estimated number of seeds for the ear, a number of seeds along a longitudinal axis of the ear, and a radial axis that is generally perpendicular to the longitudinal axis of the ear. For example, the electronic data processor 120 or yield estimator 119 is configured to adjust the size or the yield of the harvestable plant component for the one or more target plants based on an estimated number of kernels for the ear, a number of kernels along a longitudinal axis of the ear, and a radial axis that is generally perpendicular to the longitudinal axis. Further, the radial axis is associated with a number of seeds (e.g., kernels) along a circumferential path, radius or diameter of the ear, or defined by the radial seeds (e.g., kernels) that intercept a cross-sectional plane of the ear of grain (e.g., corn). In some configurations, the ear may be defined by an expected or observed total quantity of seeds for the ear that is relative to an average, mean, mode or median size or volume of the seeds (e.g., kernels of corn) of the ear on a historic basis, or any annual basis, or a regional basis (e.g., county-by-county) or geographic area by geographic area based on climate (e.g., precipitation or rainfall), soil, and growing degree days.

The electronic data processing module or the image processing module 115 may contribute data to the yield estimator 119 toward estimating the yield in accordance with one or more of the following techniques, which may be applied separately or cumulatively.

Under a first technique, the electronic data processor 120 or image processing module 115 is configured to identify any exposed seeds (of an ear or grain head) comprises applying color differentiation to the determined component pixels in the harvestable plant component to identify any exposed seeds of ear or grain head. For example, the electronic data processor 120 or image processing module 115 is configured to identify any exposed kernels comprises applying color differentiation to the determined component pixels in the harvestable plant component to identify any exposed kernels of maize or corn.

Under a second technique, the electronic data processor 120 or image processing module 115 is configured to identify any exposed area of any exposed seeds (of a grain head or ear) within the component pixels by applying at least one of segmentation, pattern recognition, color differentiation and edge detection to the component pixels of the one or more target plants. For example, the electronic data processor 120 or image processing module 115 is configured to identify any exposed area of any exposed grain kernels within the component pixels by applying at least one of segmentation, pattern recognition, color differentiation and edge detection to the component pixels of the one or more target plants.

Under a third technique, the electronic data processor 120 or image processing module 115 quantifying a portion (e.g., counts a total number of exposed kernels) of exposed seeds for a corresponding ear of corn or maize or individual seeds of grain, where the number or quantity of exposed seeds (e.g., kernels) may comprise an estimate of the total number of seeds along a length or a longitudinal axis of the ear of corn, maize, grain or cereal. For example, the electronic data processor 120 or the image processing module 115 counts the number of seeds of soy, seeds of small grains, or kernels or corn or maize. Small grains and soy may be well suited or better suited for such counting because the harvestable plant component is more exposed.

Under a fourth technique, the electronic data processor 120 image processing module 115 quantifying a portion, percentage, or faction of exposed kernels versus total kernels for a corresponding ear of corn or maize, where the number or quantity of exposed kernels may comprise an estimate of the total number of kernels along a length or a longitudinal axis of the ear of corn or maize.

Under a fifth technique, the electronic data processor 120 or image processing module 115 estimates the size, volume, and/or spatial dimensions (in two or three dimensions) of the harvestable plant component of small grain, seed pod, boll or ear of corn, such as along orthogonal axes of a Cartesian coordinate system.

Under a sixth technique, the electronic data processor 120 or image processing module 115 estimates whether the harvestable plant component comprises a full harvestable plant component, a partial harvestable plant component, or a missing harvestable plant component, such as a full ear, a small ear, or a missing ear or corn or maize. For example, the ear of corn, maize, grain or cereal is detected by a two dimension or three dimensional shape of an ear of corn, grain or cereal, such as by reference dimensions and reference shapes of such species and variety of the corn, maize, grain or cereal.

Under a seventh technique, the electronic data processor 120 or image processing module 115 estimates whether there is visual evidence in the collected image data that the harvestable plant component (e.g., corn ear, maize grain) has been diminished by drought, disease, grazing, or other factors as illustrated in some of the figures provided int his document. The harvestable plant component of small grains and cereals will often be visually available and accessible to the imaging device 110 and collection of image data. However, for corn and maize the husk may cover the seeds or kernels to limit the visual inspection of the ear, and visual factors that might be used to adjust the yield metric. Accordingly, for corn and maize, a dehusker, stripper or plant membrane remover may be used to remove the husk, pod or plant membrane from the seeds (e.g., kernels) to support uniform presentation/orientation (e.g., by rotation or movement of the harvestable plant component) and visual accessibility of the harvestable plant component to the imaging system for visual inspection.

Under an eighth technique, the electronic data processor 120 or image processing module 115 estimates any of the following: an ear size, an ear size, a mode ear size; a seed size, a mean seed size, a mode seed size a median seed size; a kernel size, mean kernel size, mode kernel size or median kernel size for a corresponding harvestable plant component (e.g., ear of corn or maize or head of grain). As used herein, an ear refers to a grain head or a grain bearing portion of a stem of a grain or cereal plant, such as corn, maize, wheat, oats, and rice. Further, the electronic data processor 120 or imaging processing module converts image data coordinates to real-world coordinates to estimate an ear size, a mode ear size, an ear volume; a seed size, a mean seed size, a mode seed size a median seed size; a kernel size, mean kernel size, mode kernel size or median kernel size for a corresponding harvestable plant component (e.g., ear of corn or maize or head of grain). For example, for corn or maize, the electronic data processor 120 can estimate the kernel size comprising a kernel volume, a mean kernel size, a mode kernel size or a median kernel size.

Under a ninth technique, the electronic data processor 120 or image processing module 115 determines if no exposed kernels are present on a target ear associated with the one or more target plants or if a total exposed kernel area is less than a target threshold for a target ear associated with one or more target plants based on the component pixels being associated with a reference husk color or defined husk color (e.g. green husk color for growing plants, a yellowish brown, brownish, or tan husk color for dried down husks). For example, the electronic data processor 120 may trigger, recommend to an end user via a user interface 118, or apply a dehusking process to the target ear to remove at least a portion of the husk of the target ear, where husk portion of an ear or when husk pixels or husk voxels are identified by image classification, color differentiation or image segmentation, or other image processing processes, such as image classifiers 123 associated with the training of neural networks or artificial intelligence algorithms for husk pixel identification. One example of possible de-husking (husk-removal) assembly or process is described in conjunction with FIG. 13 to expose seeds or kernels for inspection of disease damage, insect damage, microbe damage, animal damage, or microorganism damage, or for counting to assess yield metrics.

Although the disclosure can estimate yield (e.g., relative yield to other plants, rows, field portions or fields, or absolute yield per unit land area) alone by the estimation of the size of the harvestable plant component or ear of corn or maize without any exposed portion (e.g., with zero or no exposure) of kernels, if there is an exposed portion available organically or naturally, alone or supplemented by the dehusking process, the estimation of the yield may be based on both the size of the harvestable plant component and the available image information portion of the ear of corn or maize.

In some embodiments, the electronic data processor 120 or yield estimator 119 can augment or supplement the estimated yield (e.g., estimated yield indicator) based on size of the harvestable plant component (e.g., ear) with an adjustment (e.g., addition or subtraction) to suggested yield indicated by the exposed portion of the harvestable plant component (e.g., ear of corn or maize). The electronic data processor 120 or yield estimator 119 can augment or supplement the estimated yield based the size of the harvestable plant component in accordance with procedures that may be applied, separately or cumulatively.

Under a first procedure, the electronic data processor 120 or yield estimator 119 can determine or execute a subtraction to suggested yield based on the exposed portion of the ear, corn, or maize where the ear is diseased or deformed.

Under a second procedure, the electronic data processor 120 or yield estimator 119 can estimate a sectional yield of a harvester or combine, a relative yield at the head of a harvester or combine, or an aggregate yield for at least a portion of the field, or an entire field, based on iteratively obtaining image data of the harvestable plant components of one or more target plants throughout the field such that the target plants represent a statistically significant sample size for the field; iteratively detecting of the size of each ear of corn associated with corresponding target plants, and iteratively augmenting the detected size of each ear of corn with yield data derived from the exposed portion of each ear for one or more target plants throughout the field for the iteratively obtained image data for the ears in the field.

Under a third procedure, the electronic data processor 120 or image processing module 115 estimates or optionally estimates a plant height of the one or more target plants in the obtained image data and a corresponding or relative component height range for a harvestable plant component (e.g., ear, pod head, or boll) in the obtained image data to reduce a search space size in the obtained image data for a component pixels of a harvestable plant component.

Figure 1D:
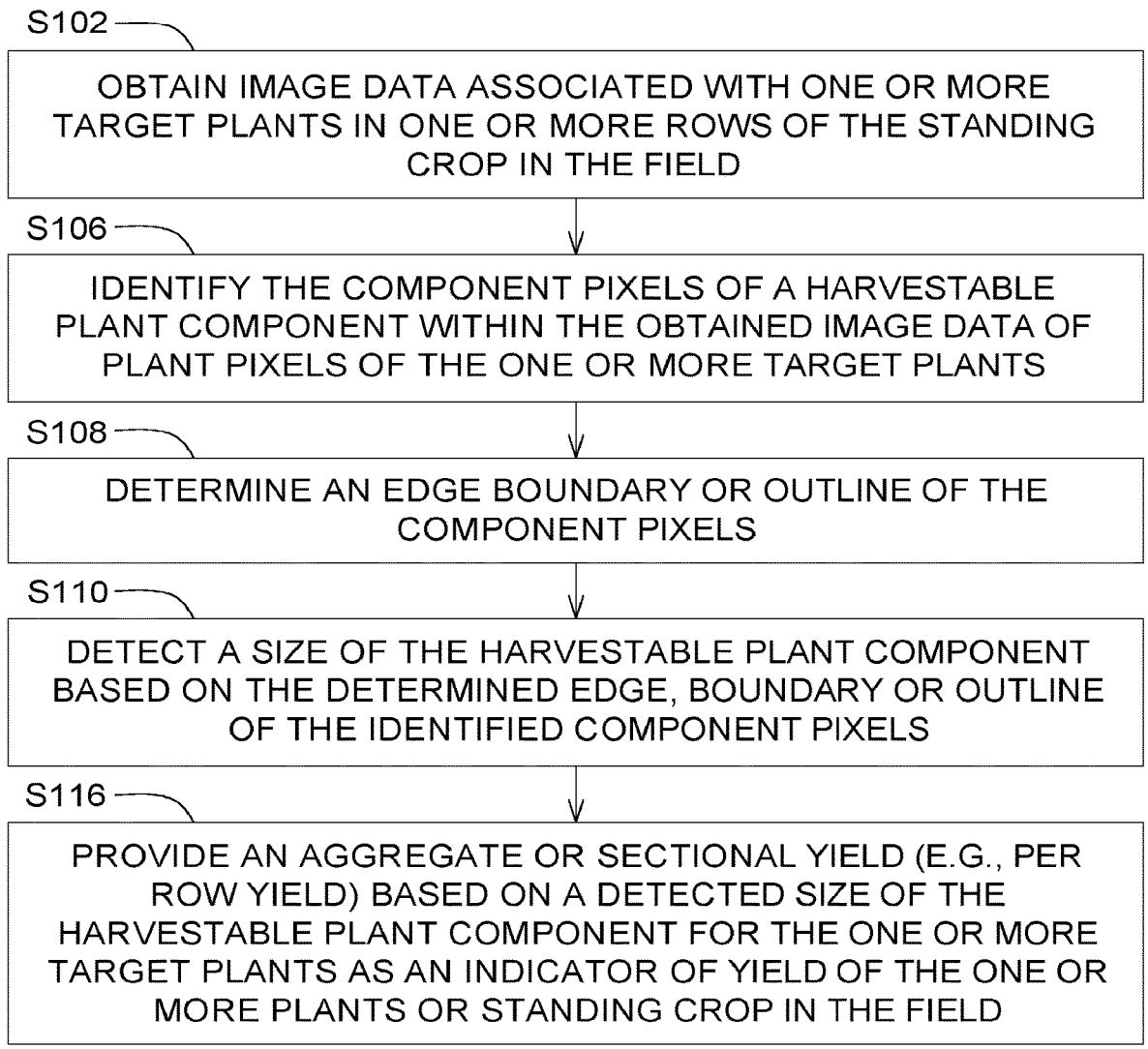
FIG. 1D is a flow chart of yet another embodiment of a method for estimating yield of a standing crop in a field.

In accordance with one embodiment as illustrated in FIG. 1A and FIG. 1D, the method for estimating yield or a yield metric of a standing crop in a field begins with step S102. Like steps or features are indicated by like reference numbers; details of the steps hitherto set forth in conjunction with FIG. 1B or FIG. 1C can be applied to FIG. 1D as if fully set forth to accompany the following explanation of FIG. 1D.

In step S102 of FIG. 1D, an imaging device 110 is configured to obtain image data associated with one or more target plants in one or more rows of the standing crop in the field.

In step S106, the electronic data processor 120 is configured to identify the component pixels of a harvestable plant component within the obtained image data of plant pixels of the one or more target plants. For example, electronic data processor 120 is configured to estimate a spatial region of interest of plant pixels of one or more target plants in the obtained image data for a harvestable plant component and its associated harvestable plant component pixels of the harvestable plant component.

In step S108, an edge, boundary or outline of the component pixels is determined or detected.

In step S110, the data processor 120 is configured to detect a size of the harvestable plant component based on the determined edge, boundary or outline of the identified component pixels (of the harvestable plant component).

Further, as an optional augmentation of step S110, the data processor 120 is configured to identify any exposed portions of grain, maize, corn, fiber volume/strands, or seeds, beans, legumes, or oilseeds, for any adjustment (e.g., increase or decrease) to the size or a yield of the harvestable plant component, where the harvestable plant component comprises an ear of maize or corn, a small grain, a legume seed pod, a seed pod, or a boll.

In step S116, a data processor 120, or yield estimator 119 is configured to provide a yield indicator (e.g., via a user interface 118) based on the detected size of the harvestable plant component for the one or more target plants and based on an adjustment associated with the exposed portions, of the one or more plants or standing crop in the field.

In one embodiment, the harvestable plant component comprises a target ear of corn, maize or grain, oilseed, legume, bean or boll. The electronic data processor 120 or yield estimator 119 may estimate a yield reduction in the per plant yield or a yield metric. As used throughout this document, the yield metric may comprise one or more of the following: per plant yield, individual plant yield, per row yield, relative yield per plant, biomass estimate, plant height estimate, relative yield per row, or relative yield per section of a harvester or combine, or aggregate yield per plant area unit. Further, the electronic data processor 120 or yield estimator 119 may determine the yield metric, alone or in combination with a yield reduction or adjustment, in accordance with one or more of the following techniques, which may be applied separately or cumulatively.

Under a first technique, the electronic data processor 120 or yield estimator 119 is configured to estimate a yield reduction to the yield metric (e.g., a per-plant yield or plant row yield, sectional yield, or aggregate yield) by color differentiation of exposed grain seeds (e.g., kernels) of the target ear; wherein the providing the yield metric comprises a yield-adjusted yield metric (e.g., a per-plant yield or a row yield, sectional yield, or aggregate yield) of the one or more plants or the standing crop in the field. For example, the electronic data processor 120 or yield estimator 119 is configured to estimate a yield reduction to the aggregate yield by color differentiation of exposed grain seeds (e.g., kernels) of the target ear; wherein the providing the yield metric comprises a yield-adjusted aggregate yield (e.g., yield reduced aggregate yield) of the one or more plants or the standing crop in the field.

Under second technique, the electronic data processor 120 yield estimator 119 is configured to determine a potential cause of the yield reduction to the yield metric based on color differentiation of the exposed grain seeds (e.g., exposed kernels) at an outer end (e.g., top end) opposite the base end of the ear of target corn. For example, the yield reduction of an estimated yield metric may be caused, without limitation, by any of the following factors: smuts and molds, poor pollination, insect feeding damage, animal damage, and environmental stress, such as climate; severe weather, such as hail, high winds, frost, freezing or low temperatures; drought, excess of water or rain; exceptional heat; lack of nutrients, such as nitrogen, phosphorus or potassium, or trace minerals, such as calcium, or the like.

Under a third technique, the electronic data processor 120 or yield estimator 119 is configured: (a) to sampling multiple target ears throughout the field to determine the potential cause of the yield reduction to the yield metric and (b) to estimate or to facilitate estimation or recording of a geographic position in two-dimensional or three dimensional coordinates of each one of the sampled target ears throughout the field to determine an aggregate yield reduction associated with the yield-reduced aggregate yield. For example, the electronic data processor 120 and imaging processing module may sample multiple target ears throughout the field to determine the potential cause of the yield reduction; and the location-determining receiver 130 may estimate a geographic position in two-dimensional or three dimensional coordinates of each one of the sampled target ears throughout the field to determine an aggregate yield reduction associated with the yield-reduced aggregate yield.

Under a fourth technique, the electronic data processor 120 or yield estimator 119 determines the potential cause that comprises suggesting, identifying, or recognizing a fungus, smut, bacteria, virus, mold, microorganism, or pathogen (e.g., or providing, via a user interface, a potential pathogen identifier or a list of potential pathogen identifiers) as the potential or actual cause based on: (a) classification, identification, recognition, or detection of observed pathogen color pixels in, commingled with, or appearing in conjunction with the harvestable component pixels or exposed harvestable plant component pixels (e.g., ear pixels), or (b) classification, identification, recognition, or detection of observed spectral-specific electromagnetic energy (e.g., certain light wavelengths/frequencies in the visible, infra-red, near-infrared, or ultraviolet ranges) indicative of observed pathogen spectral pixels in, commingled with, or appearing in conjunction with the harvestable plant component pixels or exposed harvestable plant component pixels (e.g., exposed ear pixels of maize or corn), or (c) classification, identification, recognition or detection of both above items a and b.

Further, cumulatively or separately from the above detection of observed pathogen color pixels or observed pathogen spectral pixels, the electronic data processor 120 determines or provides (e.g., via a user interface) a possible pathogen identifier or list of possible pathogen identifiers, of a corresponding possible or actual pathogen infecting the plant or harvestable plant component, based on: (1) color pixels (in two-dimensional space) or color voxels (in three-dimensional space) that satisfy a color classification criteria, and/or (2) an observed spectral profile of magnitude versus frequency/wavelength for spectral pixels or spectral voxels (e.g., pixels or voxels which represent visible light and/or non-visible light electromagnetic energy) that satisfy a spectral classification criteria, such as one or more specific reference spectral frequency or wavelength ranges associated with magnitude peaks or magnitude valleys (of the respective possible pathogen) in observed electromagnetic energy (e.g., reflected and/or absorbed electromagnetic energy) associated with the harvestable component pixels, component voxels or exposed harvestable component pixels (e.g., exposed ear pixels or voxels).

The pathogen color may represent an identifier or characteristic of the respective pathogen, such as a white or whitish pixel color; a gray or grayish pixel color; rust or rust-tone pixel color; black or blackish pixel color; brown or dark pixel color, or another pathogen pixel color or pathogen pixel wavelength range that uniquely identifies a corresponding phylum, class, order, family, genus or species of the respective particular pathogen. Similarly, the pathogen spectral pixel, pathogen spectral voxel, pathogen spectral component, or reference pathogen spectral component is indicative of a respective potential pathogen, a list of respective potential pathogens, or a corresponding phylum, class, order, family, genus or species of the respective particular pathogen. For example, pathogen spectral pixel or pathogen spectral voxel is associated with a magnitude versus frequency/wavelength response for observed visible light, ultra-violet light and/or near-infrared light (e.g., that is associated with reflection and/or absorption with respect to the plant or its harvestable plant component). Further, the magnitude versus frequency/wavelength response of observed spectral component (e.g., or spectral pixel) may be characterized by one or more minima and maxima of key spectral wavelengths that uniquely identifies one or more of the following: a respective potential pathogen, a list of respective potential pathogens, or corresponding phylum, class, order, family, genus or species of the respective particular pathogen. For example, the key pathogen color and/or key pathogen spectral wavelength may be determined by a dominant wavelength or wavelength range of light (e.g., visible and non-visible light or electromagnetic radiation) that is: (1) reflected by the pathogen color pixels for reception of the reflected dominant wavelength of light (e.g., hue) to (e.g., a lens of) the imaging device 110 and detection by spectroscopic analysis of the image processing system or electronic data processor 120, and/or (2) absorbed by the pathogen color pixels for detection of attenuation or absorption of a dominant wavelength of light (e.g., hue) to (e.g., a lens of) the imaging device 110 and detection by spectroscopic analysis of the image processing system or electronic data processor 120

In one configuration, if the electronic data processor 120 determines that the observed color pixels of the harvestable component pixels or exposed ear pixels meet or exceed a threshold level of a pathogen color (e.g., humanly visible range of colors, shades or hues) to qualify as pathogen color pixels. For evaluation or analysis of observed color pixels and voxel colors and observed spectral pixels, the reference pathogen data, such as the threshold level of the pathogen color (e.g., range of white, grey, brown, black or rust colors, shades or hues) and/or the key pathogen spectral wavelength for minimum or maximum magnitudes of observed light (or electromagnetic radiation) are defined for the respective particular pathogen or list of respective possible pathogens and the corresponding color space. For instance, the data storage device 114 may store respective pathogen identifiers or lists of pathogen identifiers, corresponding threshold levels of pathogen colors and key pathogen spectral wavelengths, corresponding phylum, class, order, family, genus or species of the respective particular pathogen, other pathogen reference data that can be accessed, read or retrieved by the electronic data processor 120.

In the red-green-blue (RGB) color space, certain pathogen pixels (e.g., dark or black pathogen pixels) may have a criteria that each of the red, green, and blue color components be less than defined values. In the hue-saturation-intensity (HSI) color space, certain pathogen pixels (e.g., dark or black pathogen pixels) may have an intensity component less than a defined value. In some examples, the color classification criteria for pixels or voxels may be extended to include parameters from multiple adjacent pixels meeting the color classification criteria which form regions. Cumulative with the color classification and/or spectral wavelength classification, the region parameters (e.g., as two-dimensional or three-dimensional representations of point clouds) may include diameter, volume, area, shape, dimensions, lines, curves, boundaries or the like.

Under a fifth technique, the electronic data processor 120 or yield estimator 119 determines a potential cause of the yield reduction based on the size of the exposed ear at the outer end (e.g., top end) opposite the exposed grain kernels at the base end of the ear of target corn, where the exposed grain kernels at the top end are underdeveloped, missing, or absent for a portion of the outer end. Further, the electronic data processor 120 and imaging processing module may sample multiple target ears throughout the field to determine the potential cause of the yield reduction; and the location-determining receiver 130 may estimate a geographic position in two-dimensional or three dimensional coordinates of each one of the sampled target ears throughout the field to determine an aggregate yield reduction associated with the yield-reduced aggregate yield.

Under a sixth technique, the electronic data processor 120 or yield estimator 119 is configured to determine of the potential cause comprises suggesting a nutrient deficiency or nitrogen deficiency based on a reduced size of the top end of one or more target ears of corn in the field.

Under a seventh technique, the electronic data processor 120 or yield estimator 119 is configured to determine the potential cause comprises suggesting a lack of pollination based on a reduced size of the top end of one or more target ears of corn in the field.

Under an eighth technique, the electronic data processor 120 or yield estimator 119 is configured to estimate a first yield reduction component to the aggregate yield based on comparison of observed exposed grain seed (e.g., kernels) of the target ear to reference exposed grain seeds (e.g., kernels) of reference images (e.g., a training data set for artificial intelligence image classifier 123).

Under a ninth technique, which can complement or augment the eighth technique, the electronic data processor 120 or yield estimator 119 is configured to estimate a second yield reduction component to the aggregate yield derived from fungus, mold or plant disease data for the growing season in the same geographic region or county as the field, wherein the providing of the aggregate yield comprises a yield-reduced aggregate yield of the one or more plants or the standing crop in the field derived from or based on the first yield reduction component and the second yield reduction component.

Under a tenth technique, the electronic data processor 120 or yield estimator 119 is configured: (a) to estimate a first yield reduction component to the aggregate yield based on application of observed, obtained image data of component pixels to an artificial intelligence algorithm that is or was trained based on reference image data of exposed grain kernels representative of diseased pixel sets and healthy pixel sets of the harvestable plant component; and (b) to estimate a second yield reduction component to the aggregate yield derived from classification or identification of the diseased pixel sets in the obtained image data of component pixels for the growing season in the same geographic region or county as the field; wherein the providing of the aggregate yield comprises a yield-reduced aggregate yield of the one or more plants or the standing crop in the field derived from or based on the first yield reduction component and the second yield reduction component.

Under an eleventh technique, the electronic data processor 120 or yield estimator 119 is configured to estimate a plant height of the one or more target plants in the obtained image data and a corresponding component height range for a harvestable plant component in the obtained image data to reduce a search space size in the obtained image data for a component pixels of a harvestable plant component.

Figure 2:
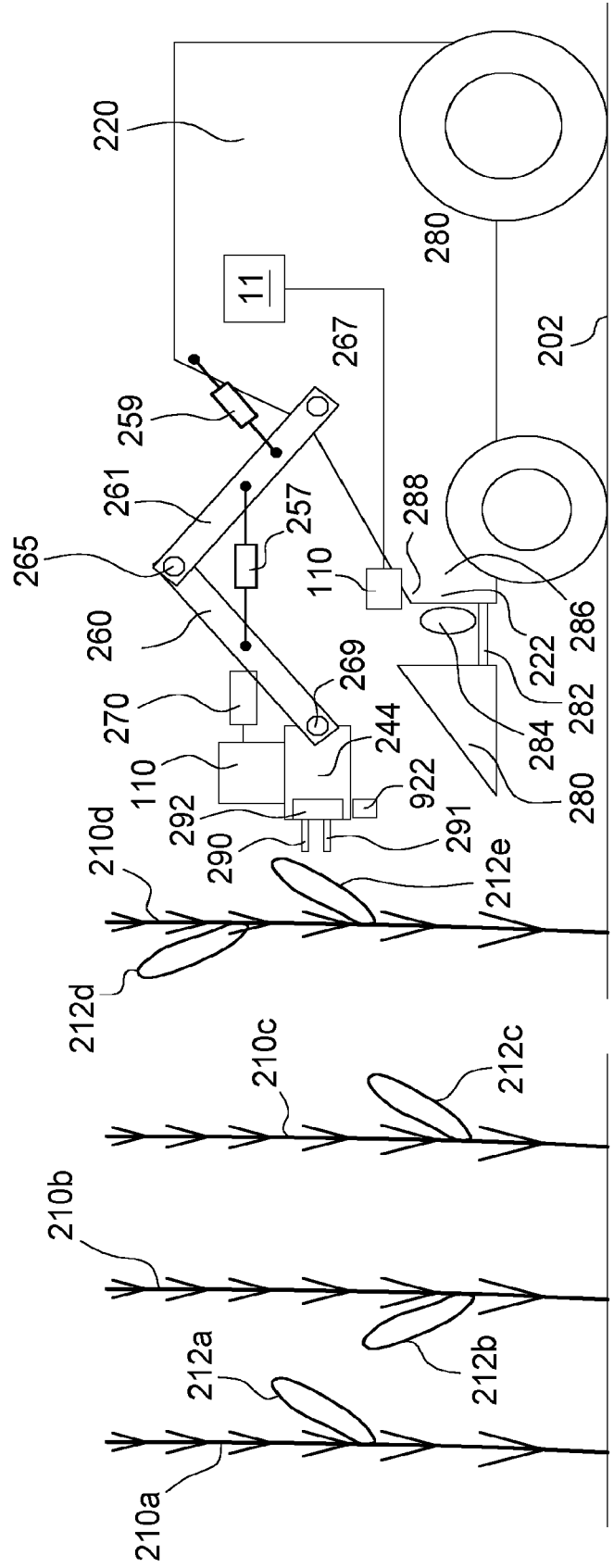
FIG. 2 is a side view of an agricultural vehicle that incorporates or comprises a system for estimating yield of standing crop in a field.

FIG. 2 is a side view of an agricultural vehicle 220 (e.g., harvester, combine or scouting vehicle) that incorporates or comprises a system 11 for estimating yield of standing crop in a field. It may not be possible plant seeds such that the full length, depth, and width of a harvestable plant component (212a, 212b, 212c, 212d, 212e) will be visible completely to an imaging device 110 on the agricultural vehicle 220, harvester or combine, such as where an ear is partially exposed on a side of stalk (e.g., partially or completely covered with leaves) or in front of stalk relative to a direction of travel of the harvester. Accordingly, the agricultural vehicle 220, harvester or combine may have an arm (260, 261) for rotating, moving or orientating the harvestable plant component (212a, 212b, 212c, 212d, 212e) for line of sight and standard or uniform orientation with respect to the imaging device 110.

As used herein, an arm (260, 261) typically has at least several rotational joints or universal joints (e.g., rotatable joints), where a first joint 267 is rotationally, pivotally, or movably coupled between a body, frame or mount of the agricultural vehicle 220 (e.g., harvester, combine or its implement) and a first arm member 261; where a second joint 265 is rotationally, pivotally, or movably coupled between the first arm member 261 and the second arm member 260 that is remote from the body of the agricultural vehicle (e.g., harvester, combine or its implement).

For example, the second arm member 260 may terminate in an optional third joint 269 that is rotationally, pivotally, or movable coupled between the second arm member 260 and an adjustable mounting device 244 that comprises a gimbal or adjustable device for adjusting the pan, down tilt, zoom, tilt, roll, or yaw of an imaging device 110. The adjustable mounting device 244 may be associated with one or more actuators (e.g., electromechanical actuators, such as actuator 116) to control, adjust, position, lock and hold the pan, down tilt, up tilt, zoom, tilt, roll, or yaw of an imaging device 110. In one configuration, each joint (265, 267, 269) may rotate in one more planes (e.g., orthogonal) that are angled with respect to one another. Further, the electronic data processor 120 may control a first actuator 259, a second actuator 257, and a third actuator 270 with data messages to adjust three dimensional position and attitude of the imaging device 110 to obtain a visible direct sign or line of sign view of harvestable plant components, such as ears in FIG. 2 or soybean pods in FIG. 8.

As illustrated in FIG. 2, the actuator 116 of FIG. 1 may further comprises a first actuator 259, a second actuator 257, and a third actuator 270. Each actuator (259, 257, 270) may comprise an electromechanical device, an electrohydraulic device, a linear actuator, an electric motor with a rotor coupled to a screw mechanism, or the like. Each actuator (259, 257, 270) may have one or two shafts that can controllably move or slide in a generally linear path, where each shaft terminates in a mounting mechanism (e.g., a substantially cylindrical mount for receiving a fastener) or where the housing of the actuator has a mounting mechanism for attachment to the arm (260, 261), vehicle 220, or the adjustable mounting device 244. The first actuator 259 and second actuator 257 are configured to control an arm that comprises a first arm member 261 and a second arm member 260, collectively, as described above in conjunction with the imaging device 110. As illustrated, the third actuator 270 is coupled between the second arm member 260 and the imaging device 110, or alternately between the second arm member 260 and the adjustable mounting device 244.

In the alternate embodiment, the second arm member 260 may terminate in, or be coupled (e.g., pivotally) to, one or more of the following: (1) an adjustable mounting device 244, (2) a gimbal or adjustable device for adjusting the tilt, roll, or yaw of an imaging device 110, and/or (3) dehusker, husk remover, desheller, stripper, scraping/abrading rollers, or plant membrane remover for removing an outer plant membrane from a harvestable plant component (e.g., ears of maize, corn, pods of legumes, or bolls of cotton) and a second actuator or set of actuators that is configured to control the dehusker, husk remover, desheller or stripper. For example, the second arm member 260 may terminate in an adjustable mounting device 244, a gimbal or adjustable device for adjusting the tilt, roll, or yaw of a dehusker, husk remover, desheller, stripper, scraping/abrading rollers, or plant membrane remover of the harvestable plant component to facilitate a unobstructed path, a line-of-site view of harvestable plant component, a nondestructive path (of plant tissue), or path of suitable resistance of the (plant tissue) arm to a target harvestable plant component.

In one embodiment, based on feedback from the imaging device 110 and the image processing module on the position, orientation or alignment of the harvestable plant component (212a, 212b, 212c, 212d, 212e) or obscuring foliage/leaves, the data processor 120 may generate one or more control messages to one or more actuators (116, 259, 257, 270), via one or more data ports 112, to control movement of an arm (260, 261), such that the arm rotates, twists, moves, aligns, or orients the harvestable plant component (212a, 212b, 212c, 212d, 212e) for potentially unobstructed line of sight observation (e.g., scanning or visual inspection) and standard or uniform orientation. For example, the data processor 120 may generate one or more control messages to one or more actuators (116, 259, 257, 270) to control rotation, movement, alignment or orientation of the arm (260, 261) where the feedback is provided or derived from an image processing module 115, a classifier 123, a discriminator 125, GBP identification module 122, and/or a sub-image module 124 to maximize display of visible seeds or kernels (e.g., by color differentiation/pixel quantity of seed pixels) within collected image data or within sub-images associated with corresponding modeled or observed orientations (e.g., different angular or alternate views/perspectives) of the harvestable plant component (212a, 212b, 212c, 212d, 212e) with respect to the imaging device 110.

In one example, in FIG. 2 the end of arm (261, 260) may terminate in or comprise fingers (290, 291) that grip or compress the harvestable plant component (212a, 212b, 212c, 212d, 212e) to rotate the harvestable plant component relative to stalk or plant stem. For example, at least one slidable finger 291 may slide along a linear guide member or curved guide member 292 relative to a stationary finger 290 on the guide member 292, where the slidable finger 291 is moved by an actuator coupled between the guide member 292 (or integral with the guide member 292) of the slidable finger to compress, grasp, clamp, or grab the harvestable plant component between the slidable finger 291 and the stationary finger 290.

Some embodiments may use one or more imaging devices 120 to collect image data for processing in accordance with examples that may be executed separately or collectively. In a first example, if the agricultural vehicle 220 comprises a harvester or combine, gathering chains (e.g., or mechanical fingers or protrusions associated with the gathering chains) on the header 280 of a harvester or combine can engage a stalk or plant stem in a manner that allows the stalk or plant stem to pass through a row unit, while capturing or guiding the harvestable plant component (e.g., ears or GBP) past one or more imaging devices 110 on one or more row units (e.g., mounted on the header 220 above the auger 284 of the harvester or combine) to collect suitable image data (e.g., normalized image data). In a second example, if the agricultural vehicle 220 comprises a harvester or combine, one or more imaging devices 110 may be positioned and oriented (e.g., on the upper shroud, side shroud, or housing 288 of the feeder house 286) to view the harvestable plant component (e.g., ears or GBP) within the feeder house 286 or on the belt 282 of the feeder house for a uniform or normalized presentation of the collected image data of the harvestable plant component to the image processing module 115, yield estimator 121, edge detector 121, classifier 123 and/or discriminator 125. In a third example, if the agricultural vehicle 220 comprises a harvester or combine, one or more imaging devices 110 may be positioned to observe an intersection the row gathering chains of the header 280 and the transverse header, or near an auger 284 and/or belt 282 that is associated with the feeder house 286 of the harvester or combine (e.g., without additional orienting hardware). In a fourth example, the data processor 120 or yield estimator 119 may estimate yield metrics based on portion of an ear that is visible in the collected image data and extrapolate/estimate image data from that visible portion to the whole ear; similarly, the yield estimator 119 may estimate yield metrics based on a portion of seeds within the ear that are visible in collected image data.

Under a fifth example, as the harvester or combine harvests the harvestable plant portion (e.g., ears), a sequence or order of the harvestable plant components (212a, 212b, 212c, 212d, 212e) in each row of plants (210a, 210b, 210c, 210d, collectively, as an illustrative row) is not preserved. For example, as corn or maize is harvested, ears may drop off the stalk in the row with a displacement or relative position vector to the actual plant location of the stalk in the plant row.

Under a sixth example, as the harvester or combine harvests the harvestable plant portion (e.g., ears), a sequence or order of the harvestable plant components (212a, 212b, 212c, 212d, 212e) in each row or row unit of the header 280 is not preserved. For example, in certain harvester and combine header 280 (e.g., corn head) designs, ears may bounce forward or backward within rows or row units of the header 280. In addition, the ears can even bounce between rows or row units of the header 280. Accordingly, if the image data is not augmented or processed, the imaging device 110 may not observe accurately or record image data in the correct sequence that is aligned with the geographic position or three dimensional coordinates of the particular plant that produced one or more corresponding harvestable plant components (e.g., ears). Accordingly, the imaging device 110, in conjunction with the image processing module 115, may optically track the movement of ears as they bounce between rows or row units of the header 280 of the harvester or combine so yield estimates are assigned to the correct plant that produced the ear, or such that the ears are associated with the initial row unit that acquired the ear during harvesting.

In a seventh example, the header 280 may comprise physical dividers (e.g., vertical walls) between rows or row units on the header 280 to prevent, reduce or mitigate inter-row bounce.

In an eighth example, "ear catchers" on each row or row unit of the header 280 (e.g., corn header) can preserve the sequence of ears that drop off the stalk prematurely or that bounce when encountering the deck plate (e.g., an offset plate extending laterally for about the width or lateral dimension of the feeder house 286 with an adjustable front/aft position for its front edge) or other ear stripping element.

Figure 3:
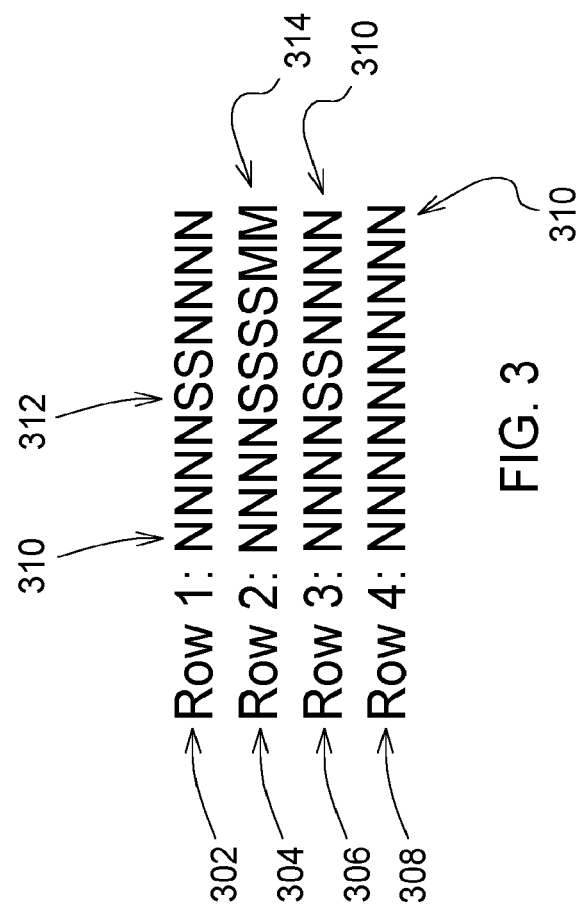
FIG. 3 is one possible illustrative chart of yield level indicator for a corresponding row section of crop plants.

FIG. 3 is one possible illustrative chart of yield level indicator (e.g., yield metric) for a corresponding row section of crop plants. FIG. 3 provides a yield map for a portion of a field, such as four rows of a portion of the field. Each plant has an associated yield metric selected from the set of the following yield metrics: (1) normal plant yield, which is represented by the symbol N; (2) smaller than a threshold (e.g., average, mean, mode, median or other statistically derived value) ear size for the plant, which is represented by the symbol S; and (3) missing ear for the plant, which is represented by the symbol M. Each plant in the row is associated with corresponding two or three dimensional coordinates, which may be arranged as or aligned with a grid.

In certain embodiments, the yield level indicator or yield metric may comprise one or more of the following: (a) an aggregate yield of harvestable plant components for corresponding cultivated land unit or area of field on which a crop is planted, harvested or grown, where the aggregate yield can be expressed as volume, weight or mass per land unit area; (b) a sectional yield of a strip of cultivated land on which a crop is planted, harvested or grown, where the aggregate yield can be expressed as volume, weight or mass per land unit area or per total lineal distance for a strip of fixed width (e.g., harvested strip having a width approximately equal to a harvester or combine swath or header width); (c) a yield of one or more rows of a harvester or combine that collects or harvests harvestable plant components from cultivated land where the aggregate yield can be expressed as volume or mass per row or row unit of the combine or harvester; (d) number of harvestable plant components (e.g., ears of maize or corn) per land unit area, strip area, strip length, or set of rows of the combine or harvester, or another yield measurement (e.g., that is known or generally accepted for purposes of conducting transactions in agricultural commodities); (e) per plant yield, expressed in number of harvestable plant components, or volume, weight or mass of harvestable plant components per plant.

For example a four row corn harvester could have an aggregate yield for an area of 200 bushels/acre (i.e., bu/ac), as measured or estimated by the imaging device 110, previous remote sensing (e.g., a prior satellite imaging of fields), a crop model, by a yield monitor, a secondary yield sensor or other yield sensing device. The four rows may have Normal (N), Small (S), and Missing (M) ear patterns for that are illustrated in FIG. 3. For purposes of sectional yield estimation, let S=0.5N and M=0 and then 200 bushels/acre=30N+8S+2M solves to N of approximately 6 bushels/acre.

Substituting for N, S, and M in the four row ear sequences above, from top to bottom have sectional yields or per row yields as follows:

Row 1: 54 bu/0.25 ac=216 bu/ac
Row 2: 36 bu/0.25 ac=144 bu/ac
Row 3: 54 bu/0.25 ac=216 bu/ac
Row 4: 60 bu/0.25 ac=240 bu/ac

Alternately, the yield map can be generated based on one or more of the following: (a) an ear count per plant, row or field section which may be useful in explaining aggregate yield, such as an as-harvested population; and (b) a simple size classifier 123. It would identify ears and their ear length (e.g., in-husk length) in, say, inches. Alternately, the length metric could be used to classify ears as typical, small, or missing. A map layer could be generated for each class by count/area, percentage by area, etc. The ratios of sizes and counts could be used to back allocate aggregate yield to sectional yield or per row yield, or to back allocate aggregate yield of a larger area to a smaller area sectional yield or strip yield within a field. The yield metrics may be displayed on local or remote display 142 as numbers; a map element by color, pattern, icon, intensity, or any other suitable graphical and/or textual representation.

In another configuration, a higher level of classification would capture additional causal information to supplement the yield metric or other estimated yield parameters. For example, an ear might not only be small (S), but may be recognized to be small because of a disease. Similarly, an ear might be missing (M) because it was eaten by an animal, such as a deer, a raccoon, or a ruminant.

In yet another configuration, the yield estimator 119 may estimate an aggregate yield for a field or an evaluated portion of a field based on an estimate number of harvested ears or harvestable plant components, and a respective mean, mode, median or average number of seeds corresponding to the particular size rank of the harvested ear. The yield estimator 119 may rank a size of the harvested ears or harvestable plant components into one or more bins, buckets or ranges, such as equal ranges of deciles or quartile rankings of size to determine an average, mode, median or mean seed count based on observed ear sizes within each bucket. That is, each size rank (of ears or harvestable components) within the decile, quartile or other range may be associated with a corresponding mean, mode, median or average for that size rank, rather than an aggregate average, median, mode, or mean for all of the harvested ears or harvestable plant components with the field or evaluated portion of the field.

For quartile size rank of ear size within the field or evaluated portion of the field, $C_1, C_2, C_3, C_4$, where $C_1$ is the subtotal number of harvested ears the largest rank size; $C_2$ is the subtotal number of harvested ears of rank size less than $C_1$ and greater than $C_3$; $C_3$ is the subtotal number of harvested ears of rank size less than $C_2$ and greater than $C_4$; and $C_4$ is the subtotal number of harvested ears of the lowest range size. For the field or evaluated portion of the field (e.g., or based on look-up tables, or prior historical yield, crop variety, rainfall, growing degree days, crop measurements, or empirical measurements), $K_1$ is the average, mean, median or mode number of seeds per ear for $C_1$ sized ears; $K_2$ is the average, mean, median or mode number of seeds per ear for $C_2$ sized ears; $K_3$ is the average, mean, median or mode number of seeds per ear for $C_3$ sized ears; $K_4$ is the average, mean, median or mode number of seeds per ear for $C_4$ sized ears; and aggregate yield is $Y_A$. The following equation provides the aggregate yield, which can also be used to derive sectional yields or row yields if the evaluated portion of the field is defined as a row or section of a harvester or combine:

$$Y_A = C_1 K_1 + C_2 K_2 + C_3 K_3 + C_4 K_4$$

The imaging device 110 may collect image data or images such as the images of ears of corn or maize illustrated in FIG. 4A through 4G, inclusive. For example, multiple images of the ears may be collected as an ear is harvested and moved from the header or the combine or harvester toward the auger, or engages the deck plate of the header (280, 1060) or feederhouse (286, 1040). The imaging device 110 may collect images based on sensors (e.g., charge-coupled devices) that can detect various frequency bands or wavelengths of electromagnetic radiation or light, such as infrared, near infrared, and ultraviolet. For example, if the imaging device 110 uses near-infrared sensors (e.g., detectors) and near-infrared reflectance spectroscopy and color imaging sensors for visible light, then the collected images are well-suited for detection of fungus or mold on kernels or seeds of corn. In one embodiment, the imaging device 110 and image processing module 115 may track the path of the ear in the header (280, 1060) and into the feederhouse (286, 1040) for path linearity to adjust the header or feed-rate settings. The image processing module 115, the classifier 123 and the yield estimator 119 can process the collected images to estimate yield metric, yield loss or an adjustment in the yield.

Figure 4B:
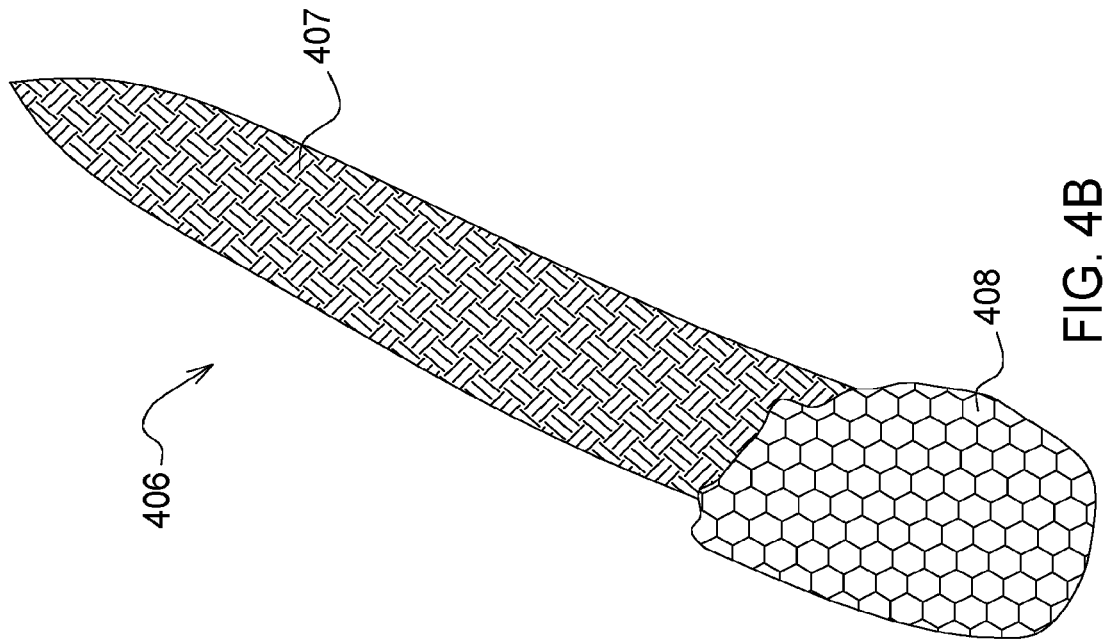
FIG. 4B is an illustrative image of a hypothetical ear of corn with a substantial portion missing kernels or corn or maize.
Figure 4A:
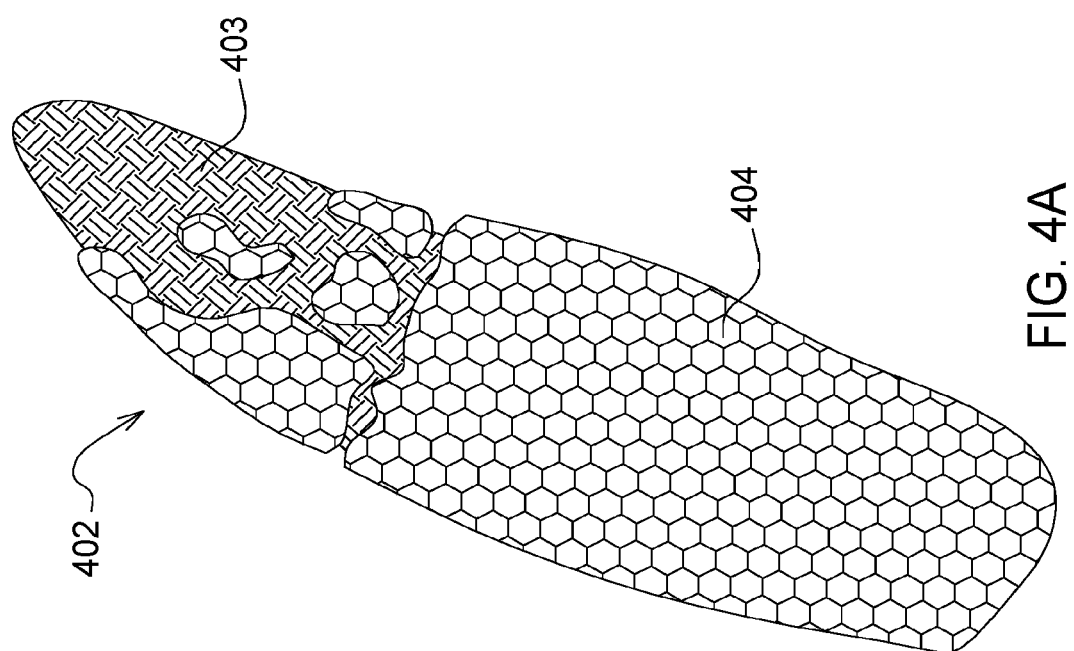
FIG. 4A is an illustrative image of a hypothetical distressed, undersized ear of corn or maize.

FIG. 4A is an illustrative image of a hypothetical distressed, undersized ear 402 of corn or maize. As shown, the ear 402 has a first region (e.g., majority region) of normally developed kernels 404 and a second region (e.g., minority region) of underdeveloped or missing kernels 403 in an underdeveloped region. The undersized ear 402 could result from various agronomic factors, such as drought, disease, lack of pollination or other stress. If the image processing module 119, classifier 123, or data processor 120 identifies the undersized ear 402 in association with a corresponding plant, row or field, the yield estimator 119 may adjust downward or decrease size of the ear by the estimated amount of the second region of underdeveloped or missing kernels.

FIG. 4B is an illustrative image of a hypothetical partially eaten ear 406 of corn with a substantial portion missing kernels 407 or corn or maize and a portion of normally developed kernels 408. For example, FIG. 4B may represent an ear that has been partially or entirely eaten by an animal, such as a deer, a raccoon, or a ruminant. If the image processing module 119, classifier 123, or data processor 120 identifies the partially eaten ear 406 in association with a corresponding plant, row or field, the yield estimator 119 may adjust downward or decrease size of the ear by the estimated amount of the eaten region for the plant, but may not adjust the row yield or field row unless there are additional samples or image data to corroborate a regional material feeding of animals within the field or portion of the field.

In FIG. 4A and FIG. 4B, a husk or outer membrane of the ear has been entirely removed, whereas in practice the husk or outer membrane could be partially removed in the field. The visible portion of exposed seeds or kernels can be observed, inspected and measured along with georeferencing the location (e.g., two or three dimensional coordinates) with position data from the location-determining receiver 130. The image processing module or data processor can measure the portion of the ear with seeds or kernels that are exposed, such as a fractional, ratio, percentage or histogram range of unhusked ear, exposed seeds, or exposed kernels with respect to the total volume of the ear, the ear length, the ear radius, the ear width, or the ear depth, the total surface area of the ear, or the total number of estimated seeds or kernels of the ear. In one example, the image processing module or data processor determines a respective histogram range and a respective location for each harvestable plant component or ear, where the histogram range may be structured as quartiles (or adjacent bins of respective percentage ranges) of completely unhusked ear, partially unhusked ear, mostly husked ear, and completely husked ear.

In another example, the unhusked percentage extending from the outer tip of the ear may be weighted with greater reliability or greater confidence of observed visual quality (e.g., grain quality) of the harvestable plant component than the unhusked percentage extending from the bottom of the ear that is or was attached to the plant. In some examples, the ear visibility or exposed seed visibility of the ear may serve as a metric indicative of a corresponding reliability level or confidential level associated with any corresponding yield metric, or adjustment (e.g., reduction) to the yield metric from damaged, diseased, or eaten ears or harvestable plant components.

FIG. 4C is an illustrative image of a hypothetical insect-damaged ear 410 of corn or maize with an insect-damaged region 412 and a region of normally developed kernels 411. Here, the insect damaged region 412 may represent material corn earworm damage, for instance. If the image processing module 119, classifier 123, or data processor 120 identifies the insect damaged ear 402 in association with a corresponding plant, row or field, the yield estimator 119 may adjust downward or decrease size of the ear, plant yield, row yield and/or field yield by the estimated amount of the insect-damaged region of destroyed kernels.

FIG. 4D through FIG. 4G, inclusive, illustrate possible yield loss because of high temperatures at pollination or kernel malformation from drought or lack of nutrients can leave an ear which does have kernels or seeds over the full length of the ear or cob. In FIG. 4D, FIG. 4E and FIG. 4G the yield loss is associated with an ear length is less than a threshold normal ear length, which indicates that the growth of the ear has been stunted by the stress. The image processing module 115 or classifier 123 may classify cause and the extent of yield loss or damage to ears or harvestable plant components by plant or plant location through a field or portion of the field, where the classifier may evaluate the ear length, ear size, ear volume, kernel color, seed color, shape or misshapen ears, morphological image analysis of ear tips, morphological image processing, neural network or other suitable artificial intelligence processes.

FIG. 4D is an illustrative image of a hypothetical stress-damaged ear 414 of corn or maize. The undersized ear 414 could result from various agronomic factors, such as drought, disease, lack of pollination or other stress. If the image processing module 119, classifier 123, or data processor 120 identifies the undersized ear 414 in association with a corresponding plant, row or field, the yield estimator 119 may adjust downward or decrease size of the ear or a yield metric in accordance with one or more of the following factors: (1) an estimated amount of a region of underdeveloped kernels or missing kernels 415, (2) a proportion, ratio or faction of underdeveloped kernels/missing kernels 415 to normally developed kernels 416, and (3) a proportion, ratio or fraction of underdeveloped kernels/missing kernels 415 the overall ear size or ear size rank.

FIG. 4E is an illustrative image of a hypothetical abnormal, undersized ear 418 of corn or maize. The undersized ear 402 could result from various agronomic factors, such as drought, disease, lack of pollination or other stress. If the image processing module 119, classifier 123, or data processor 120 identifies the undersized ear 418 in association with a corresponding plant, row or field, the yield estimator 119 may adjust downward or decrease size of the ear or a yield metric in accordance with one or more of the following factors: (1) an estimated amount of a region of underdeveloped kernels or missing kernels 420, (2) a proportion, ratio or faction of underdeveloped kernels/missing kernels 420 to normally developed kernels 422, and (3) a proportion, ratio or fraction of underdeveloped kernels/missing kernels 420 the overall ear size or ear size rank.

FIG. 4F is an illustrative image of another hypothetical abnormal, stress-damaged ear 424 of corn or maize. The undersized ear 402 could result from various agronomic factors, such as drought, disease, lack of pollination or other stress. If the image processing module 119, classifier 123, or data processor 120 identifies the undersized ear 424 in association with a corresponding plant, row or field, the yield estimator 119 may adjust downward or decrease size of the ear or a yield metric in accordance with one or more of the following factors: (1) an estimated amount of a region of underdeveloped kernels or missing kernels 425, (2) a proportion, ratio or faction of underdeveloped kernels/missing kernels 425 to normal kernels 426, and (3) a proportion, ratio or fraction of underdeveloped kernels/missing kernels 425 the overall ear size or ear size rank. FIG. 4F illustrates the longitudinal axis 427 of the ear, and the radius 432 that is generally perpendicular to the longitudinal axis 427.

FIG. 4G is an illustrative image of yet another hypothetical abnormal, stress-damaged ear 428 of corn or maize. The undersized ear 428 could result from various agronomic factors, such as drought, disease, lack of pollination or other stress. If the image processing module 119, classifier 123, or data processor 120 identifies the undersized ear 428 in association with a corresponding plant, row or field, the yield estimator 119 may adjust downward or decrease size of the ear or a yield metric in accordance with one or more of the following factors: (1) an estimated amount of a region of underdeveloped kernels or missing kernels (429, 430), (2) a proportion, ratio or faction of underdeveloped kernels/missing kernels (429, 430) to normally developed kernels 431, and (3) a proportion, ratio or fraction of underdeveloped kernels/missing kernels (429, 430) the overall ear size or ear size rank.

Figure 5:
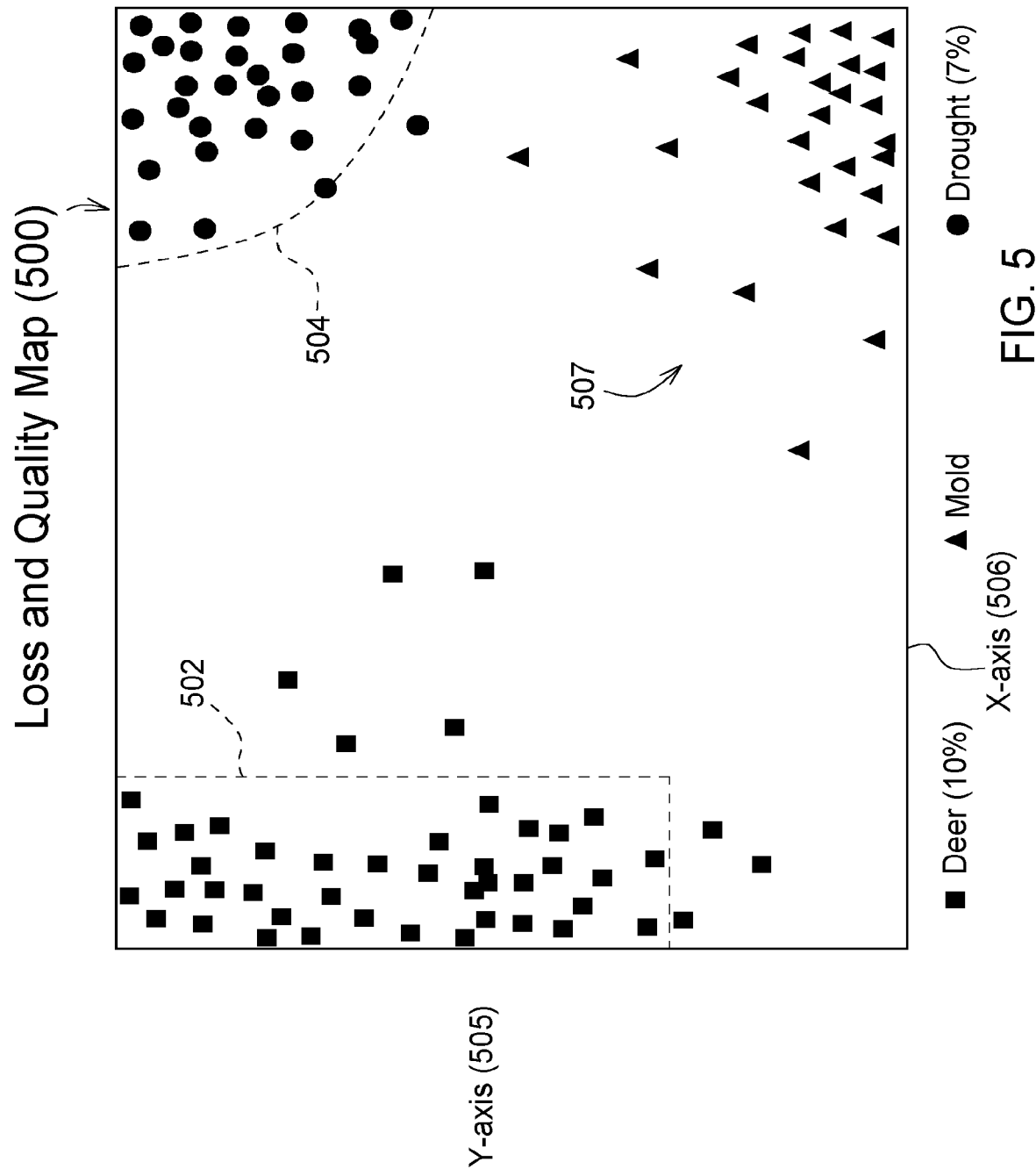
FIG. 5 is an exemplary loss and quality map for maize or corn based on corresponding estimates of root-cause data and corresponding field locations.

FIG. 5 is an exemplary loss and quality map 500 for maize or corn based on corresponding estimates of root-cause data and corresponding field locations or zones. The vertical axis or Y-axis 505 indicates the Y-axis position (e.g., geographic coordinate) of the respective stressor on the map, whereas the horizontal axis or X-axis 506 indicates the X-axis position (e.g., geographic coordinate) of the respective stressor on the map 500. The imaging device 110 may provide visible light images to the image processing module 115 to detect animal stress associated with bare cobs without kernels or seeds, or few or no kernels. The imaging device 110 may provide near-infra-red images to the image processing module 115 to detect microbial, mold or fugus stress. In particular, the imaging device 110 may provide visible light color images and/or infra-red images to the image processing module 115 to detect morphological analysis of the ear tip that is indictive of drought stress or lack of nutrients.

In FIG., 5, ears with damage or loss are associated with corresponding positions (e.g., two dimensional or three dimensional coordinates in the field). Ears with a particular yield loss or damage type are counted and divided by the total number of ears for the field or evaluated portion of the field as a yield metric. Further, the total number ears may be limited to total ears counted, or total ears with at least a certain minimum percentage (e.g., 50 percent or more) of the ear exposed in images, or even with a certain minimum percentage (e.g., 50 percent or more) of seeds or kernels of the ear exposed in the collected images. If the percentage of yield loss or damage exceeds a particular threshold for that respective type of damage or yield loss, the symbol, indicative of the loss or yield type, is marked on the map of FIG. 5. Here, in the scenario of animal stress the symbol appears on the map where the animal stress or yield loss is at least a ten (10) percent yield loss; in the scenario of the drought stress, the symbol appears on the map where the drought stress resulted in at least seven (7) percent yield loss.

A first region of animal stress or stressors (e.g., deer stress) is indicated by the dashed lines near the upper left portion of the map 500. A second region 504 of drought stress or stressors is indicated by the curved dashes lines near the upper right portion of the map 500. A third region 507 of mold stress or microbial stress is indicated in the lower right corner of the map. In the map legend, the rectangular or square symbol indicates detected animal stress (e.g., deer stress); the triangular symbol indicates detected microbial stress (e.g., mold stress); and the circular symbol indicates drought stress, which can be detected by inspection or analysis of the harvestable plant component in accordance with the procedures and systems in this disclosure.

Figure 6:
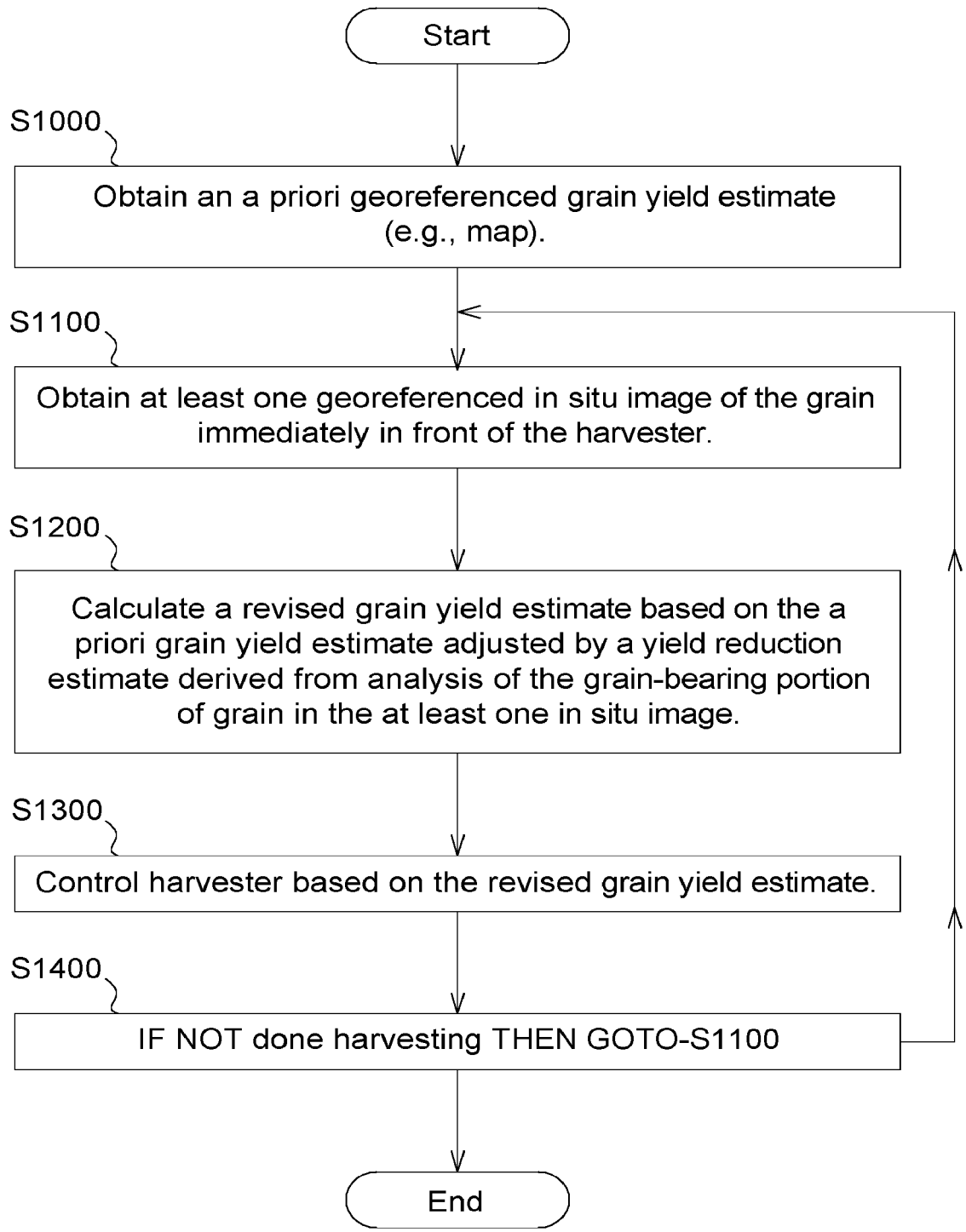
FIG. 6 is a flow chart for a method for estimating a yield reduction associated with image analysis of a harvestable plant component.

FIG. 6 is a flow chart for a method for estimating a yield reduction associated with image analysis of a harvestable plant component. The method of FIG. 6 begins in step 1000.

In step S1000, the imaging device 110 obtains a predefined, pre-existing, or a priori georeferenced grain yield estimate, such as a historic yield map of a field or portion of a field.

In step S1100, the imaging device 110 obtains at least one georeferenced in situ image of the grain immediately in front of the harvester or combine during a harvest operation within the field or portion of the field.

In step S1200, the electronic data processor 120 calculates or determines a revised grain yield estimate based on the a priori grain yield estimate adjusted by a yield reduction estimate derived from analysis of the grain-bearing portion of grain in the at least one in situ image of the harvested grain or the harvested grain-bearing portion.

In step S1300, the electronic data processor 120 controls the harvester or combine based on the revised grain yield estimate, such as sending a data message to the user interface 118 to provide the end user (or harvester operator) with an alert and an option to discontinue harvesting of the field or a portion of the field where a yield metric falls below a defined threshold. Further, the end user or harvester operator may have the option of designating the portion of the field that was abandoned for harvesting as grazing land for cattle, cows, sheep, chickens, goats or other domestic farm animals.

In step S1400, if the combine or harvester is not done harvesting, then the method continues with step S1400.

FIG. 7 is a representative example of possible collected image data (or reference/training image data) that indicates the respective locations of identifiable, harvestable plant components in a field or row of plants, where the harvestable plant components comprise ears of corn or maize. FIG. 7 shows an example corn field image with five corn ears identified. For example, the ears were selected because of their proximity to the camera and consequent reduction in obscurants such as other plants, dust. In examples where ear proximity/distance is used as a filter, it may be determined by any suitable method, process or device such as lidar, stereo image, or plant location in the image relative to a reference mark on a harvester or combine.

In this example, the ears are outlined by respective ellipses in dashed lines. The length of the major axis or longitudinal axis of the ellipse may be used as an ear length/size metric, possibly adjusted for the distance of the ear from the camera to scale from image coordinates to real-world coordinates.

In the example of FIG. 3, the yield metric was associated with or mapped into Normal and Small sizes relative to a threshold value of size, where the threshold value may be an average, median, or mode of ear size, pod size, ear length, ear width, ear depth, ear volume, pod width, pod length, pod width, or pod volume. Here, in FIG. 7 ears 701, 702, and 703 might be classified as Normal (N) while ears 704 and 705 may be classified as small (S). A missing (M) or eaten ear can be seen at the bottom of FIG. 7 toward the right side of FIG. 7.

Ears may be identified in the image using any suitable technique. One classical image processing technique is Hough transformations to identify the edges or approximated, linear segments of edges of the ears. A second image processing approach is to identify the corn stalks, shown in FIG. 7, where ear 705 shows plant or stalk 706 outlined or encompassed with alternated short and long dashed lines. The ear 707 appears as an enlargement on the stalk distinct from leaves.

Another approach to identifying and classifying ears would be to train a neural network using image training sets in which the ears are labeled.

Figure 8:
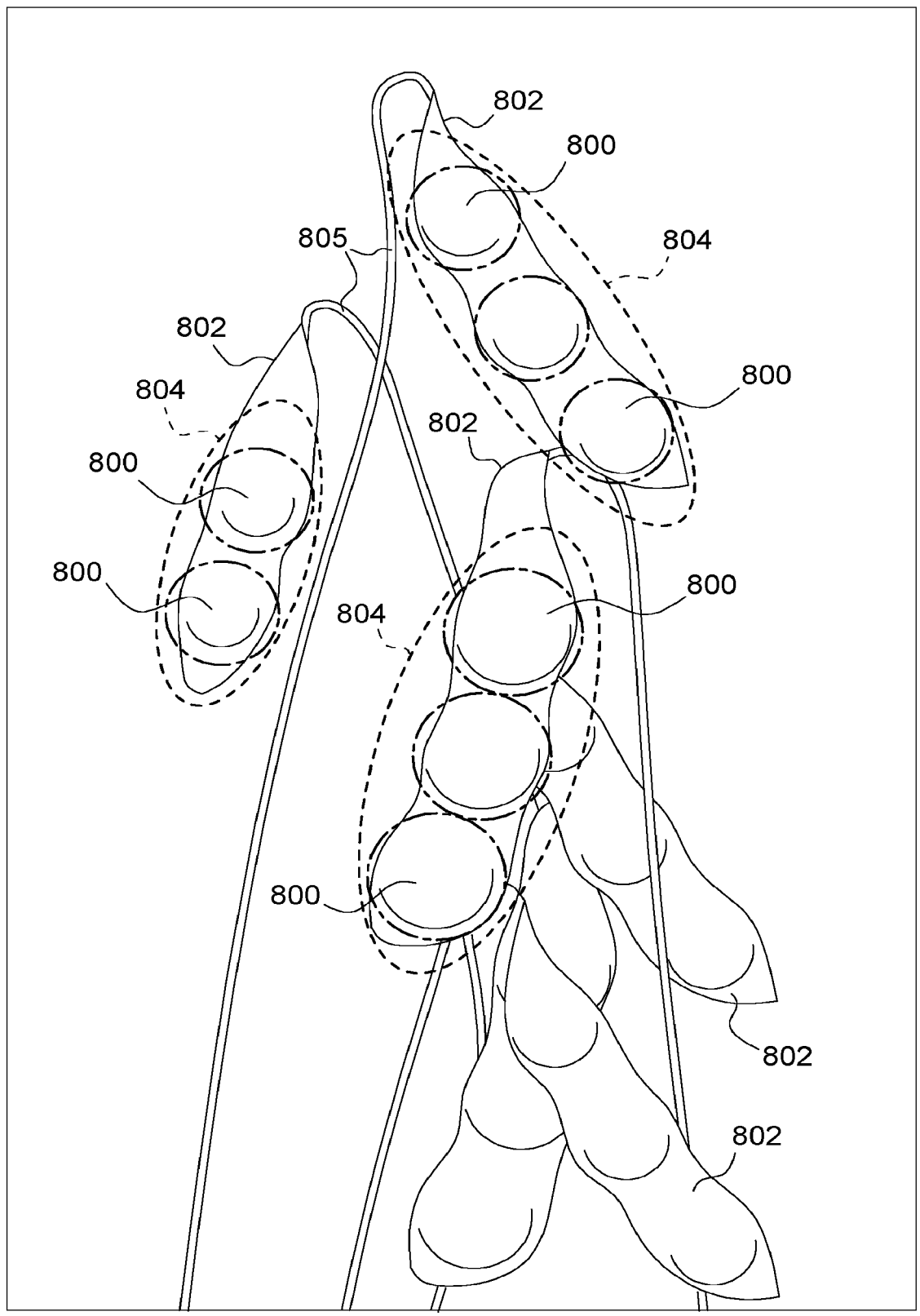
FIG. 8 is a representative example of possible collected image data (or reference/training mage data) that indicates respective locations of identifiable, harvestable plant components in a field or row of plants, where the harvestable plant components comprise pods of soybeans.

FIG. 8 is a representative example of possible collected image data (or reference/training mage data) that indicates respective locations of identifiable, harvestable plant components in a field or row of plants, where the harvestable plant components comprise pods 802 of soybeans 800 that are attached to stems 805 of the plants. In one configuration, the imaging device 110 acquires collected image data similar to that of FIG. 8, which the image processing module 115 may process to produce the dashed lines around the soybeans 800 (or the area or volume within the dashed lines) that represent an estimate of the size (e.g., number, diameter, radius, height, width and depth, or aggregate volume) of the pods, beans, legumes, soybeans 800 therein; which, in turn, can be used by the yield estimator 119 to estimate a yield metric for a plant, a row of plants, a sectional yield or an aggregate yield of a portion of a field or field.

In some examples, the number of beans per pod will vary from two to three beans per pod, where the number is associated with certain varieties, types or cultivars of soybeans, although other varieties, types or cultivars may have different numbers of beans. Regardless, the number of beans per pod and per plant can be estimated and recorded with a corresponding geographic location of the plant. Further, the recorded number of beans per pod or beans per plant can be used to adjust harvester or combine settings for the same year or a future year of harvesting with the same field.

FIG. 8 shows mature soybeans in a field. The electronic data processor 120, yield estimator 119, and/or image processing module 115 can do image processing/analytics to estimate yield metrics (e.g., sectional yield) as one or more of the following: number of pods, pod size, beans/pod, and occurrence of pre-harvest pod shattering. Because of high soybean plant populations relative to corn, plants and plant/pod attributes may be sampled rather than measured for the whole plant population. The same sampling can be used for small grains which have even higher populations than corn or soybeans.

Soybeans and small grain harvesting may also have higher occurrence of dust and other obscurants than corn harvest. If the obscurant level impacts the data quality for the plant characterization, this may be noted such as with a measurement quality map layer or confidence level associated with the yield metric or yield reduction/adjustment data. The quality map layer may be for the obscurant level, estimated error for the plant estimate, or any other suitable metrics.

Figure 9:
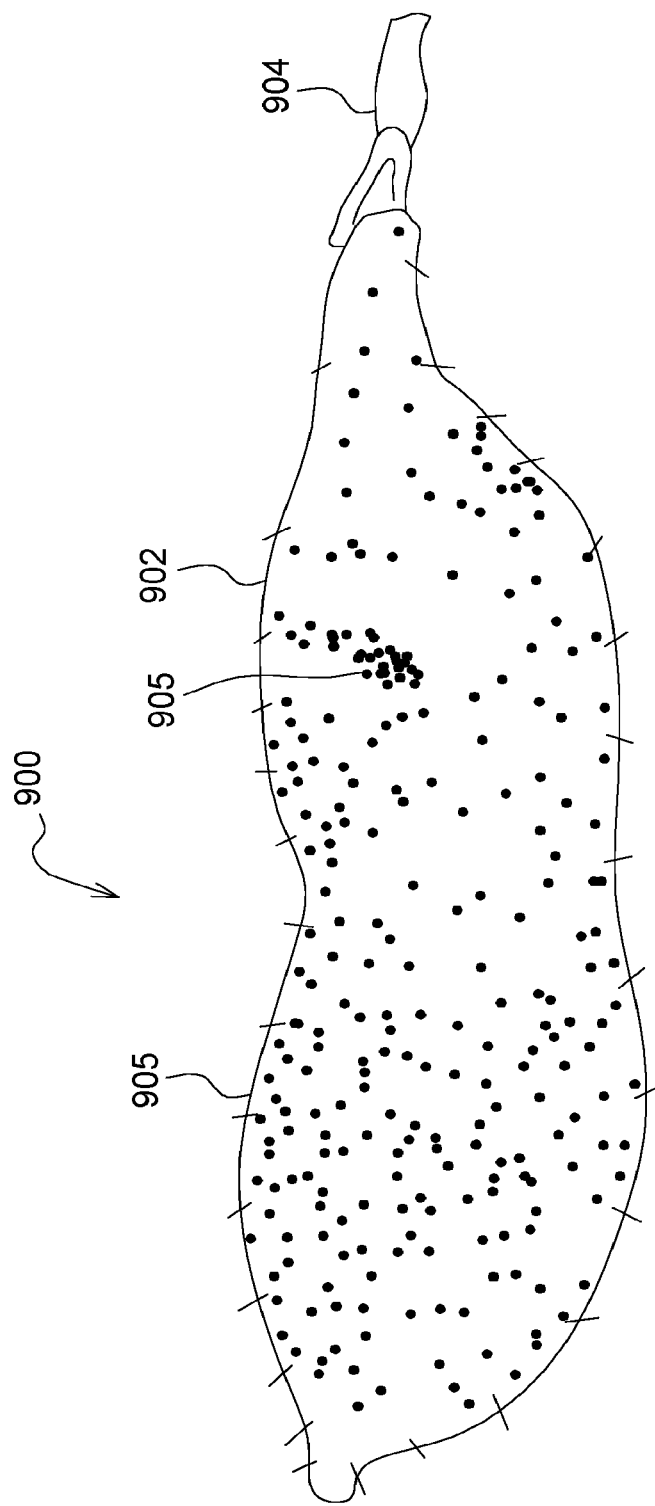
FIG. 9 is a representative example of possible collected image data (or reference/training image data) that indicates a diseased soybean pod.

FIG. 9 is a representative example of possible collected image data (or reference/training image data) that indicates a diseased soybean pod 900 with mold 905, a microbial infection, or a disease. The imaging device 110 can provide image data to the image processing module 115 to detect whether or not a soybean or pod is infected with a microbial pathogens, such as blight pycnidia. Further, frequency or histogram maps of field locations (e.g., three dimensional coordinates) associated with such microbial pathogens can be used to engage in agronomic practices, like tillage, fungicide application or the like, to potentially improve the effectiveness and precision of such tillage and/or fungicide application to the field.

Figure 10:
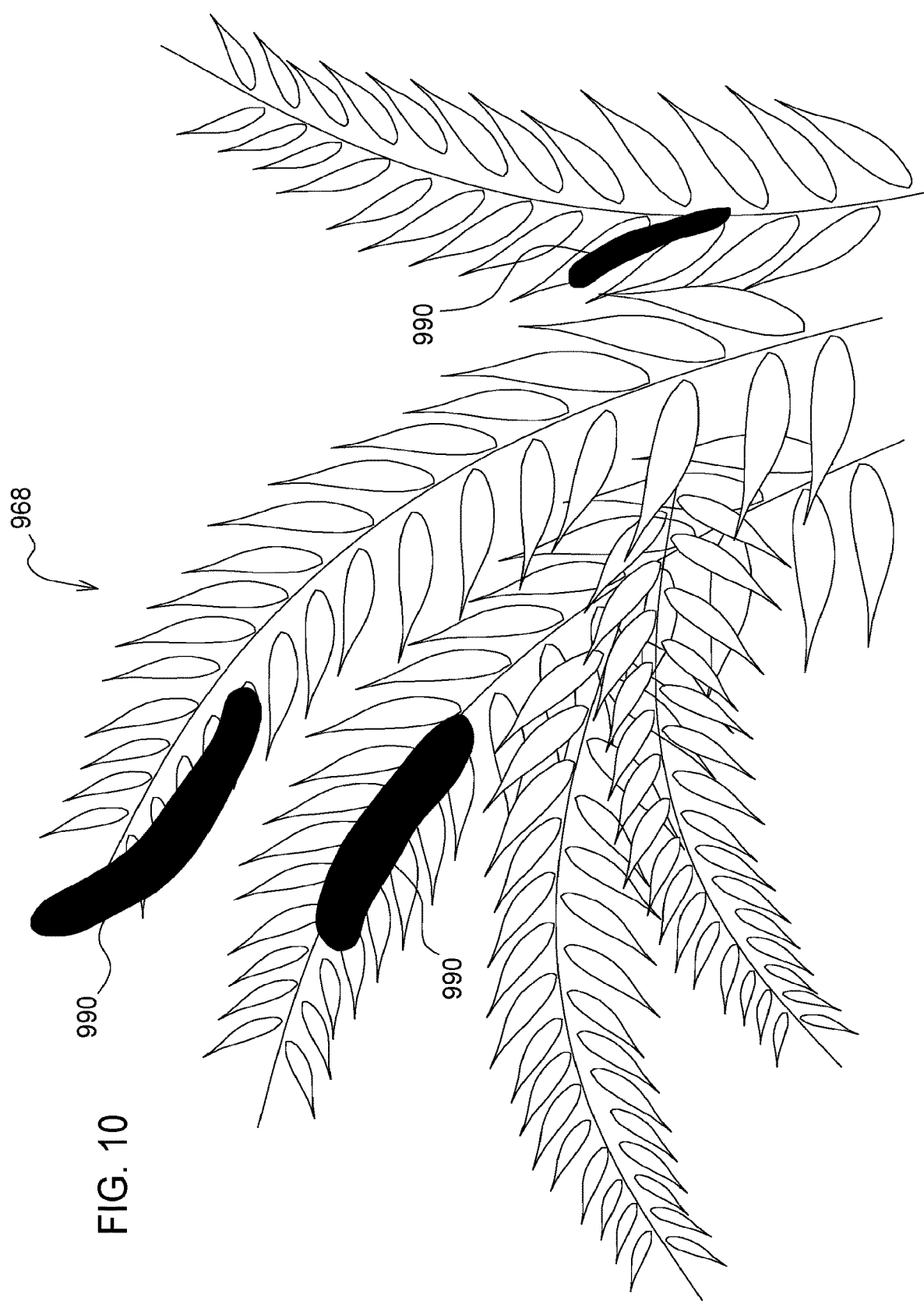
FIG. 10 is a representative example of possible collected image data (or reference/training image data) that indicates a wheat head with fungus (e.g., Ergot fungus bodies).

FIG. 10 is a representative example of possible collected image data (or reference/training image data) that indicates a wheat head 990 or ear with fungus 990 (e.g., Ergot fungus bodies). Histograms or maps of microbial pathogens, mold, fungus infection frequency versus field location (e.g., three-dimensional coordinates) may be used to segregate harvested grain (e.g., for proper disposal or alternate uses/processing in accordance with applicable laws and regulations), to apply fungicide, mildewcide, or to direct site specific tillage to mitigate or control the fungus in future growing years, for example.

Figure 11A:
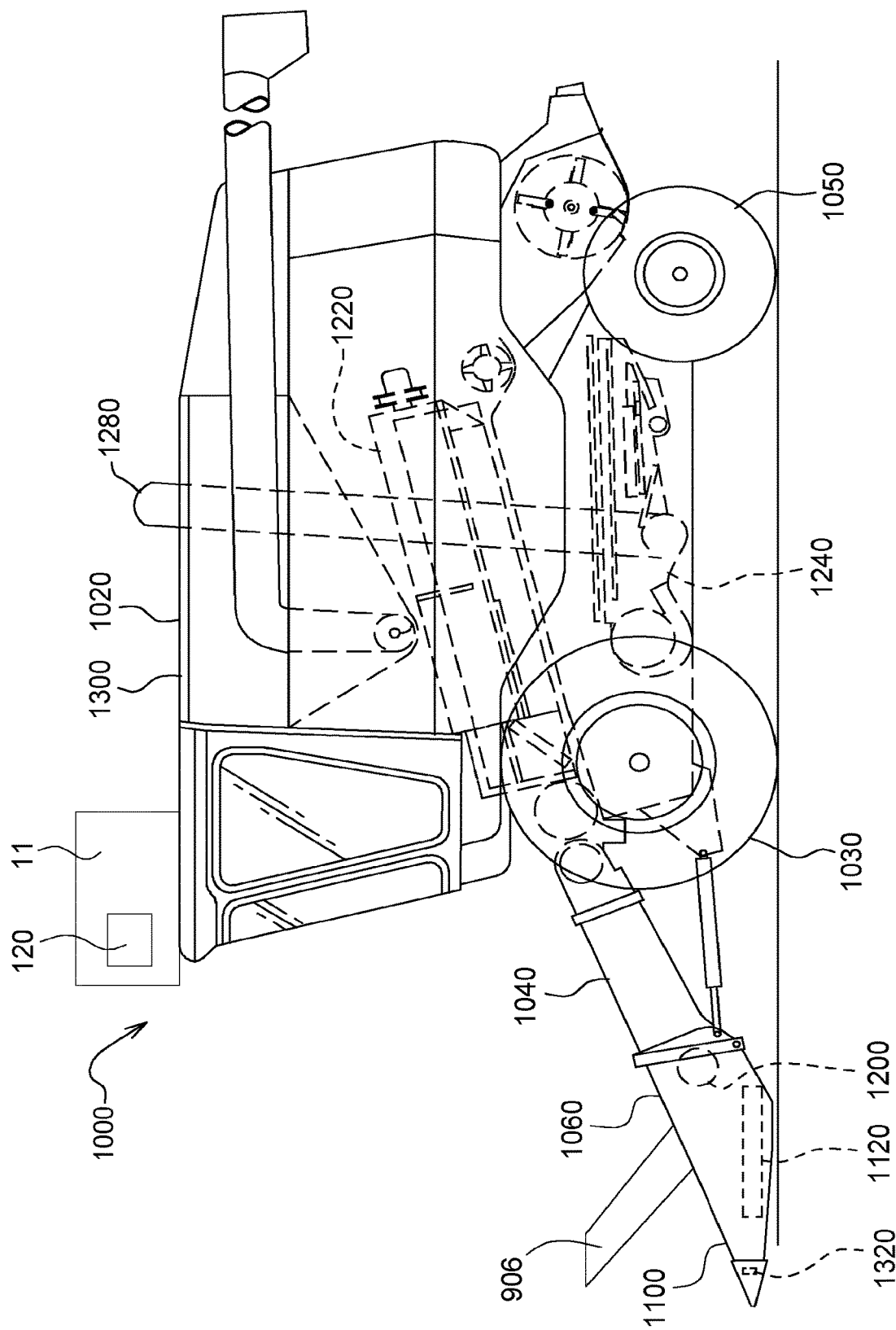
FIG. 11A is a side view of one embodiment of an agricultural harvesting vehicle that incorporates a system for estimating yield of a standing crop in a field and an ear stripper.
Figure 11B:
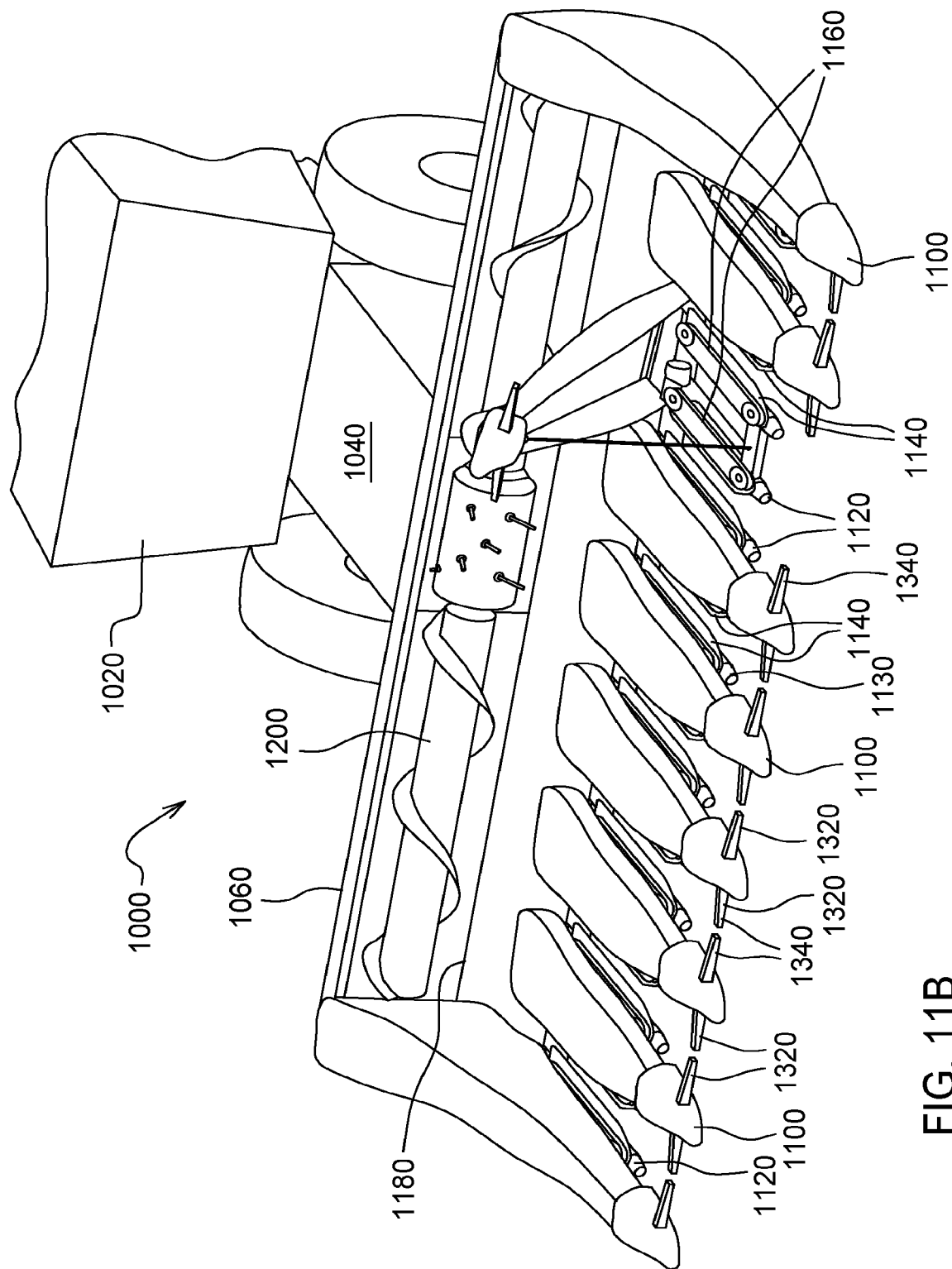
FIG. 11B is front perspective view of the agricultural harvesting vehicle of FIG. 11A.

In FIGS. 11A and 11B, an agricultural harvesting vehicle 1000 comprises a combine harvester 1020 having a feederhouse 1040 extending forward therefrom, and a row crop harvesting head 1060 (here shown as a corn head) supported on a forward end of the feederhouse 1040. The agricultural harvesting vehicle 1000 (e.g., combine) harvests plants, each comprising a stalk or stem and at least one ear.

As illustrated in FIG. 11A, an ear stripper 906 samples ears of corn from standing plants to separate the stalk and plant from the ears or harvestable plant portion, such that the imaging device 110 can collect or obtain normalized image data of the ear or harvestable plant portion for estimation of yield metrics and/or for image processing modules 115, machine learning or artificial intelligence modules, such as classifiers 123. In one embodiment, the ear stripper 906 is mounted on one or more rows of the header 1060. The ear stripper 906 functions to strip or separate the ear from the stalk or stem and present the ear or harvestable plant portion in a uniform way to the imaging device 110. The image data is sent to the data processor 120 which analyzes the image data to generate a yield estimate.

If the ear bounces out of the ear stripper 906 before an image is captured, taken or obtained, that ear may be recorded as a "miss" by the data processor 120 in that an ear was expected based on plant spacing/timing plus vehicle ground speed and the ear was not recorded in the image data. Alternately, the imaging device 110 and data processor 120 may detect and record a secondary image of the ear falling forward from the ear stripper 906, where for some percentage of the time, the fallen ear may land on the deck plate and be sent by the gathering chains 1160 (in FIG. 11B) to the transverse auger 1200.

The agricultural harvesting vehicle 1000 is supported on two front wheels 1030 that are driven by an engine (not shown) and two rear wheels 1050 that are steerable by a steering actuator. As the agricultural harvesting vehicle 1000 (e.g., combine 1020) travels through the field harvesting rows of crop, individual crop plants in each row of crop pass between adjacent crop dividers 1100, then further rearward into a row unit 1120. The row unit 1120 includes two spaced apart stalk rolls 1130 that extend in a forward direction and define a gap therebetween for receiving stalks of the crop plants. As each crop plant is received into the gap, the stalk rolls 1130 engage opposite sides of the stalk of the crop plant and pull the stalks downward.

Stripping plates 1140 are disposed above the stalk rolls and on either side of the gap. As the stalk rolls pull the stalk of the crop plant downward, ears of corn extending from the stalk of the crop plant impact the stripping plates 1140, causing the ears to be broken off the stalk.

These ears tumble and bounce upon the stripping plates 1140, and are carried rearward by gathering chains 1160 into a laterally extending through 1180 in the header (e.g. corn head).

A transverse rotating auger 1200 is disposed in the laterally extending trough. The transverse rotating auger 1200 has protruding members (e.g., flights) that engage the broken-off ears of corn and carry them to a central region of the row crop harvesting head 1060.

Once in the central region, protruding members (e.g., flights) on the transverse rotating auger 1200 carry the ears of corn rearward and into the feederhouse 1040 of the combine harvester 1020.

A conveyor (not shown, e.g., rotating conveyer belt or endless flexible conveyer belt) in the feederhouse 1040 carries the ears of corn rearward and into the body of the combine harvester 1020. Once inside the body of the combine harvester 1020, the ears of corn are threshed by at least one threshing drum 1220, and separated from the material other than grain (MOG). The kernels or seeds of grain are cleaned in a cleaning device (e.g., cleaning shoe) 1240. The now-clean kernels or seeds of grain are carried upward by a grain elevator 1280 and are deposited in a grain tank 1300.

In one embodiment, an optional contact row sensor for standing crop (e.g., vehicle guidance sensor) 1320 is fixed to a forward end of a crop divider 1100 on the row crop harvesting head 1060. The row sensor 1320 has two feelers 1340 extending outwardly from each side of the crop divider 1100. As the vehicle moves forward through the field harvesting crops the plant stalks in the row of crop 1080 move rearward into the space between adjacent crop dividers 1100. The plant stalks push against the feelers 1340 and deflect them backwards. This backward deflection causes the row sensor 1320 to generate a signal indicating the relative location of the plant stalk of plant rows with respect to the crop dividers 1100.

Figure 12:
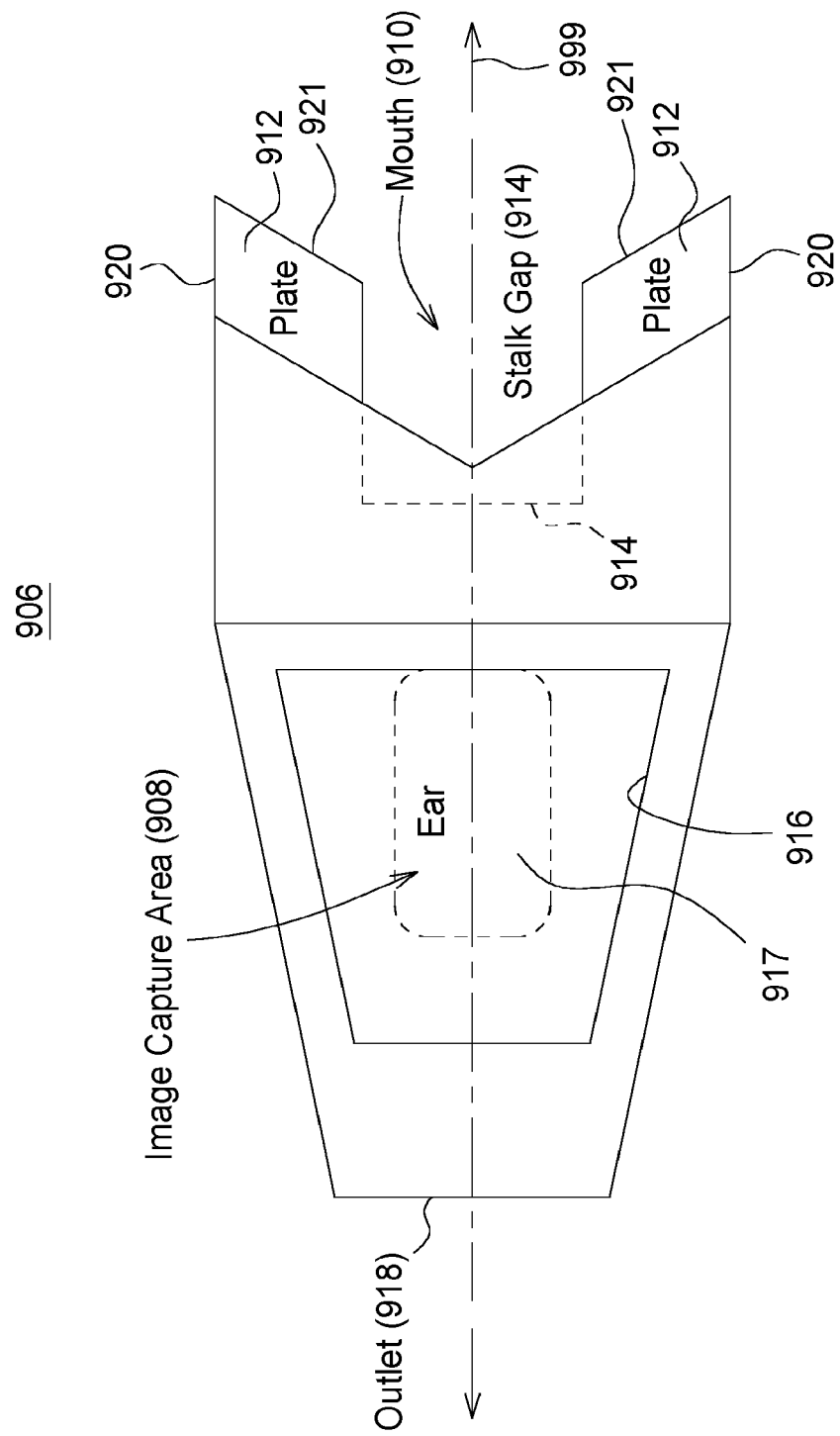
FIG. 12 is a top view of the ear stripper of FIG. 11A illustrated in greater detail.

In FIG. 12, one embodiment of an ear stripper 906 is illustrated, which is also shown in FIG. 11A. FIG. 12 shows a top view of an illustrative ear stripper 906. Like reference numbers in any set of drawings indicates like elements or features.

As the agricultural vehicle 1000 moves through the field, an sampled stalk or stem of a standing plant is guided into the stalk gap 914 from the mouth 910 by the plates 912 as the vehicle 1000 moves towards the stalk or plant. The stalk or stem is able to pass through the stalk gap 914, but the ear is caught, trapped or held (at least temporarily) by the plates 912 and detached from the stalk or stem. The leading edges 921 of plates 912 are angled inward toward a central axis 999 of the ear stripper 906. The side walls 910 of the stripper 920 are also angled, forwardly downward. Gravity alone, or together with forward movement and vibration of the vehicle 1000, moves, urges or motivates the ear into the image capture area where the imaging device 110 is able to get a uniform image of the ear to allow the yield estimator 119 or imaging processing module 115 to estimate an ear size, such as length, width, radius or volume. Further gravity, alone or together, with forward motion and vibration of the vehicle 1000, draws the ear though the outlet 918 and onto the header 1060 for transport to the feederhouse 1040.

This embodiment of the ear stripper 906 is very simple with no moving parts. In some embodiments, gravity may be assisted in moving the ear 917 with brushes, chains, belts, wheels, or other actuators. Without limitation, the following settings may be adjusted manually or automatically: stalk gap width (or use of brushes to handle varying stalk widths), ear stripper angle relative to header 1060 or a vertical axis, ear stripper height above the header, or the like.

In an alternate embodiment, the ear stripper may incorporate a stalk width sensor (e.g., ultrasonic sensor or contact sensor) which reports stalk width to the data processor 120.

In FIG. 12, the ear 917 in the image capture area 908 of the ear stripper 906 is illustrated with dashed lines because it is a transient state that will be successively replaced by new or a next sampled ear. An optional sensor (e.g., piezoelectric sensor) on a bottom surface of the image capture area 908 of the ear stripper 906 can be configured to trigger collection of the image data by the imaging device 110 to capture an image of the ear. In other embodiments, the imaging device 110 continuously captures (video) or successive still images (e.g., strobed image data) and then identifies an image or the best image containing the full ear 917 and then sending the image data to the electronic data processor 120 for analysis. The ear 917 then passes through the outlet on route to the combine feederhouse 1060.

Figure 13:
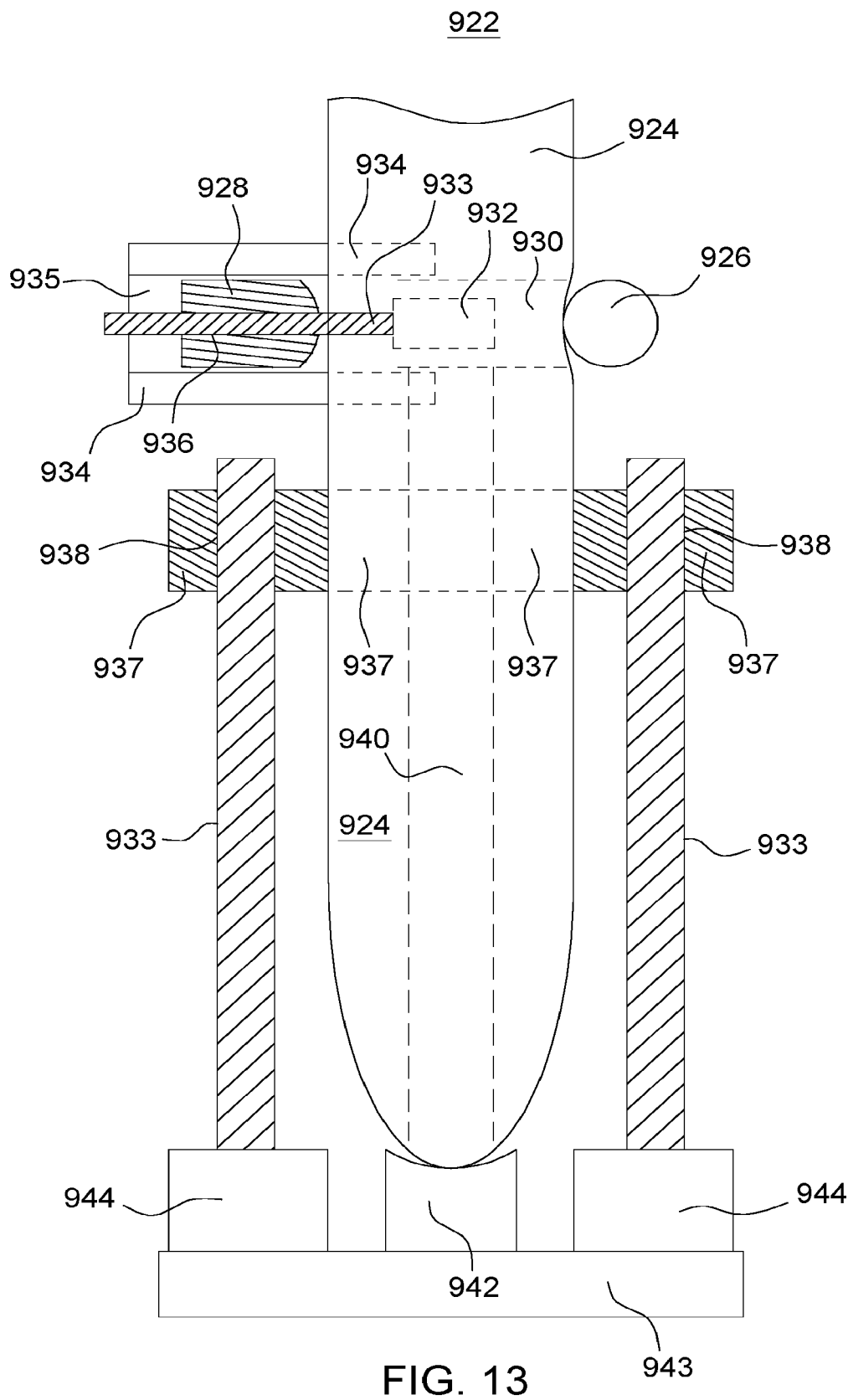
FIG. 13 is a side view or front view of one possible embodiment of a de-husking (husk-removal) assembly illustrated in greater detail than in FIG. 2.

In FIG. 13, in one embodiment, the electronic data processor 120 is configured to control one or more actuators (e.g., 932, 944) of a dehusking assembly 922 to control a dehusking process of a sampled ear of corn or maize.

The dehusking assembly of FIG. 13 comprises a lower lateral member 943 that is generally parallel to an upper lateral member 930. The lower lateral member 943 and the upper lateral member 930 are each mechanically connected to a vertical support member 940, such as a backbone. As illustrated the upper lateral member 930 has a channel 935 for limiting vertical movement of the slidable finger 928, while permitting lateral movement of the slidable finger 928 to compress the sampled ear, when moved or urged by the first actuator 932 that is secured to the upper lateral member 930.

Each actuator (932, 944) may comprise a linear actuator or an electric motor with a rotatable threaded shaft 933 or screw mechanism coupled to the rotor of the electric motor. The slidable finger 928 may have a threaded recess 936 to receive a threaded shaft 933 to impart lateral movement to the slidable finger 928 and to retain the lateral position of the slidable finger 928 when the first actuator 932 is not activated. Meanwhile, the stationary finger 926 is spaced apart from the slidable finger 928 at a width sized to receive a sampled ear and movable to clamp or retain the sampled ear between the slidable finger 928 and the stationary finger 926.

The lower lateral member 943 is associated with a lower finger 942, which may have a concave surface for retaining a top or bottom surface of a sampled ear 924. As illustrated the lower finger 942 is stationary, although in alternate embodiments it may be associated with an actuator to accommodate sampled ears of different lengths along the longitudinal axis.

An annular member 937 surrounds a substantially elliptical cross-section of the target or sampled ear 924 of corn or maize for stripping, pealing, separating or removing a husk or outer membrane from the retained target or sampled ear 924 of corn. For example, in one configuration a lower edge or lower inner edge of the annular member 937 has one or more protruding arcs or sets of teeth. Further, the annular member 937 may have threaded recesses 938 for receiving threaded rods coupled to the actuators 944 for moving the annular member 937 upward or downward for dehusking or stripping the husk or outer membrane of the harvestable plant component.

In one embodiment, the dehusking assembly 922 of FIG. 13 operates as follows and may be optionally used in conjunction with the vehicle of FIG. 2 or FIG. 11A, for example. First, the electronic data processor 120 or image processing module 115 is configured to identify a longitudinal axis or length of the target ear of corn and a lateral axis perpendicular to the longitudinal axis. Second, the electronic data processor 120 controls a first actuator 932 to apply compressive force (e.g., or to clamp), via lateral fingers (928, 926), to the lateral axis of the target or sampled ear 924 of corn to retain the target ear. Third, the electronic data processor 120 rests a lower portion of the target or sampled ear 124 of corn against a lower finger 942 to retain the target ear. Fourth, the electronic data processor 120 controls a second actuators 944 (e.g., linear actuator or electric motor with a screw mechanism coupled to the rotor of the electric motor) to move (e.g., along the longitudinal axis of the target or sampled ear 924 of corn) an annular member 937 (e.g., that surrounds a substantially elliptical cross-section of the target ear of corn or maize) for stripping, pealing, separating or removing a husk or outer membrane from the retained target or sampled ear 924 of corn. For example, in one configuration a lower edge or lower inner edge of the annular member 937 has one or more protruding arcs or sets of teeth.

Although certain embodiments of systems, methods, processes and examples have been described in this disclosure, the scope of the coverage of this disclosure may extend to variants of the systems, methods, processes and examples and systems and concepts disclosed herein. For example, in any patent that may be granted on this disclosure, one or more claims can cover equivalents and variants to the full extent permitted under applicable law, among other things.

The following is claimed:

1. A method for estimating yield of a standing crop in a field, the method comprising:
    obtaining, by an imaging device, image data associated with one or more target plants in one or more rows of the standing crop in the field;
    estimating a spatial region of plant pixels of one or more target plants in the obtained image data for a harvestable plant component and its associated component pixels of the harvestable plant component;
    identifying the component pixels of a harvestable plant component within the obtained image data of plant pixels of the one or more target plants;
    determining an edge, boundary or outline of the component pixels;
    detecting a size of the harvestable plant component based on the determined edge, boundary or outline of the identified component pixels, where the harvestable plant component comprises plant-membrane-covered portions and exposed portions of seeds;
    identifying any exposed portions of the harvestable plant component for any adjustment to the size or a yield of the harvestable plant component; and
    providing, via a user interface, a yield indicator based on the detected size of the harvestable plant component for the one or more target plants and based on an adjustment associated with the exposed portions, of the one or more plants of the standing crop in the field, where the detected size comprises: a volume of the harvestable plant component, or a length along a longitudinal axis of the harvestable plant component and a diameter or a radius of the harvestable plant component.

2. The method according to claim 1 wherein the harvestable plant component comprises an ear of grain, the method further comprising:

adjusting the size or the yield of the harvestable plant component for the one or more target plants based on an estimated number of seeds for the ear, a number of seeds along a longitudinal axis of the ear, a total quantity of seeds for the ear, or average, mean, mode or median size or volume of the seeds of the ear.

3. The method according to claim 1 wherein the identifying of any exposed portion comprises applying color differentiation to the determined component pixels in the harvestable plant component to identify the exposed portion, where the exposed portion comprises maize or corn, a grain, a bean, a legume or an oilseed.

4. The method according to claim 1 further comprising:
identifying the exposed portion of any exposed grain seeds within the component pixels by applying at least one of segmentation, pattern recognition, color differentiation and edge detection to the component pixels of the one or more target plants.

5. The method according to claim 1 further comprising:
quantifying the exposed portion of exposed kernels for a corresponding ear of corn or maize, where the number or quantity of exposed kernels may comprise an estimate of the total number of kernels along a length or a longitudinal axis of the ear of corn or maize, and a radial axis that is generally perpendicular to the longitudinal axis.

6. The method according to claim 1 further comprising:
estimating an ear size, a mean ear size, a mode ear size or median ear size for a corresponding harvestable plant component; and
converting image data coordinates of collected image data to real-world coordinates to estimate an ear size, a mean ear size, a mode ear size or median ear size for a corresponding harvestable plant component.

7. The method according to claim 1 further comprising:
estimating a seed size, a mean seed size, a mode seed size or median seed size for a corresponding harvestable plant component; and
converting image data coordinates of collected mage data to real-world coordinates to estimate the seed size, the mean seed size, the mode seed size or median seed size for a corresponding harvestable plant component.

8. The method according to claim 1 further comprising:
estimating a kernel size, a mean kernel size, a mode kernel size or median kernel size for a corresponding harvestable plant component; and
converting image data coordinates of collected image data to real-world coordinates to estimate the kernel size, the mean kernel size, the mode kernel size or median kernel size for a corresponding harvestable plant component.

9. The method according to claim 1 further comprising:
if no exposed kernels are present on a target ear associated with the one or more target plants or if a total exposed kernel area is less than a target threshold for a target ear associated with one or more target plants based on the component pixels being associated with a reference husk color, apply a dehusking process, by a plant membrane remover, to the target ear to remove at least a portion of the husk of the target ear.

10. The method according to claim 9 wherein the dehusking process further comprises:
identifying a longitudinal axis or length of the target ear of corn and a lateral axis perpendicular to the longitudinal axis;

applying compressive force, via lateral fingers of the plant membrane remover, to the lateral axis of the target ear of corn to retain the target ear;
resting a lower portion of the target ear of corn against a lower finger to retain the target ear;
moving an annular member for stripping, pealing, separating or removing a husk or outer membrane from the retained target ear of corn.

11. The method according to claim 10 wherein a lower edge or lower inner edge of the annular member has one or more protruding arcs or sets of teeth.

12. The method according to claim 1 further comprising:
augmenting or supplementing the indicator with a suggested yield indicated by the exposed portion of the ear of corn or maize.

13. The method according to claim 12 further comprising:
estimating, by a data processor, a sectional yield, a row yield or a per-plant yield for a harvester or combine, or an aggregate yield for at least a portion of the field, or an entire field, based on iteratively obtaining image data of the harvestable plant components of one or more target plants throughout the field such that the target plants represent a statistically significant sample size for the field; iteratively detecting of the size of each ear of corn associated with corresponding target plants, and iteratively augmenting the detected size of each ear of corn with yield data derived from the exposed portion of each ear for one or more target plants throughout the field for the iteratively obtained image data for the ears in the field.

14. The method according to claim 1 further comprising:
estimating a plant height of the one or more target plants in the obtained image data and a corresponding component height range for a harvestable plant component in the obtained image data to reduce a search space size in the obtained image data for a component pixels of a harvestable plant component.

15. The method according to claim 1 wherein obtaining image data associated with one or more target plants comprises obtaining the image data by an imaging device on a combine or harvester during harvesting of the standing crop in the field.

16. A method for estimating yield of a standing crop in a field, the method comprising:
obtaining, by an imaging device, image data associated with one or more target plants in one or more rows of the standing crop in the field;
estimating a spatial region of plant pixels of one or more target plants in the obtained image data for a harvestable plant component and its associated component pixels of the harvestable plant component;
identifying the component pixels of a harvestable plant component within the obtained image data of plant pixels of the one or more target plants;
determining an edge, boundary or outline of the component pixels;
detecting a size of the harvestable plant component based on the determined edge, boundary or outline of the identified component pixels, where the harvestable plant component comprises plant-membrane-covered portions and exposed portions of seeds;
identifying any exposed portions of the harvestable plant component for any adjustment to the size or a yield of the harvestable plant component;
providing, via a user interface, a yield indicator based on the detected size of the harvestable plant component for the one or more target plants and based on an adjustment associated with the exposed portions, of the one or more plants or standing crop in the field;

if no exposed kernels are present on a target ear associated with the one or more target plants or if a total exposed kernel area is less than a target threshold for a target ear associated with one or more target plants based on the component pixels being associated with a reference husk color, apply a dehusking process, by a plant membrane remover, to the target ear to remove at least a portion of the husk of the target ear.

17. The method according to claim 16 wherein the dehusking process further comprises:

identifying a longitudinal axis or length of the target ear of corn and a lateral axis perpendicular to the longitudinal axis;

applying compressive force, via lateral fingers of the plant membrane remover, to the lateral axis of the target ear of corn to retain the target ear;

resting a lower portion of the target ear of corn against a lower finger to retain the target ear;

moving an annular member for stripping, pealing, separating or removing a husk or outer membrane from the retained target ear of corn.

18. The method according to claim 17 wherein a lower edge or lower inner edge of the annular member has one or more protruding arcs or sets of teeth.

19. The method according to claim 16 further comprising:

augmenting or supplementing the indicator with a suggested yield indicated by the exposed portion of the ear of corn or maize.

20. The method according to claim 19 further comprising:

estimating, by a data processor, a sectional yield, a row yield or a per-plant yield for a harvester or combine, or an aggregate yield for at least a portion of the field, or an entire field, based on iteratively obtaining image data of the harvestable plant components of one or more target plants throughout the field such that the target plants represent a statistically significant sample size for the field; iteratively detecting of the size of each ear of corn associated with corresponding target plants, and iteratively augmenting the detected size of each ear of corn with yield data derived from the exposed portion of each ear for one or more target plants throughout the field for the iteratively obtained image data for the ears in the field.

* * * * *